(12) United States Patent
Lee et al.

(10) Patent No.: US 12,043,821 B2
(45) Date of Patent: Jul. 23, 2024

(54) FERMENTATION AND AGING APPARATUS AND METHOD FOR CONTROLLING FERMENTATION AND AGING APPARATUS

(71) Applicant: LG ELECTRONICS INC., Seoul (KR)

(72) Inventors: Daewoong Lee, Seoul (KR); Yongbum Kim, Seoul (KR); Jinpyo Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1108 days.

(21) Appl. No.: 16/872,512

(22) Filed: May 12, 2020

(65) Prior Publication Data
US 2020/0362279 A1 Nov. 19, 2020

(30) Foreign Application Priority Data
May 15, 2019 (KR) .......................... 10-2019-0057086

(51) Int. Cl.
*C12C 7/26* (2006.01)
*C12C 11/00* (2006.01)
(Continued)

(52) U.S. Cl.
CPC .............. *C12C 7/26* (2013.01); *C12C 11/006* (2013.01); *C12C 13/10* (2013.01); *C12H 1/22* (2013.01);
(Continued)

(58) Field of Classification Search
None
See application file for complete search history.

(56) References Cited

U.S. PATENT DOCUMENTS 4,652,451 A * 3/1987 Leedham ............... C12M 41/26
426/11
7,963,213 B1 * 6/2011 Murdock ................ C12C 13/10
99/323.1
(Continued)

FOREIGN PATENT DOCUMENTS

CN    102722129    10/2012
CN    103129841    6/2013
(Continued)

OTHER PUBLICATIONS

Translation of KR-200377788-Y1 (Year: 2005).*
(Continued)

*Primary Examiner* — Elizabeth M Kerr
(74) *Attorney, Agent, or Firm* — KED & ASSOCIATES LLP

(57) ABSTRACT

A fermentation and aging apparatus may include a fermentation tank defining an accommodation space in which a beverage is accommodated, a refrigerant cycle device configured to cool the fermentation tank and the beverage, a temperature sensor mounted on an outer circumferential surface of the fermentation tank, and a controller configured to control driving of the refrigerant cycle device based on a temperature sensed by the temperature sensor and a predetermined storage temperature, check a remaining amount of the beverage accommodated in the fermentation tank, and reset a storage temperature of the beverage when the checked remaining amount is lower than a predetermined reference amount.

11 Claims, 10 Drawing Sheets

(51) Int. Cl.
*C12C 13/10* (2006.01)
*C12H 1/22* (2006.01)
*F25B 49/02* (2006.01)

(52) U.S. Cl.
CPC ...... *F25B 49/02* (2013.01); *F25B 2700/2104* (2013.01)

(56) References Cited

U.S. PATENT DOCUMENTS

| | | | | |
|---|---|---|---|---|
| 2006/0131325 | A1* | 6/2006 | Wauters | F25D 31/006 222/54 |
| 2016/0201018 | A1* | 7/2016 | Watson | A47J 27/08 426/11 |
| 2017/0335257 | A1* | 11/2017 | Chong | B67B 7/26 |

FOREIGN PATENT DOCUMENTS

| | | |
|---|---|---|
| JP | H08-170868 | 7/1996 |
| JP | 2017-133825 | 8/2017 |
| KR | 20-0377788 | 3/2005 |
| KR | 200377788 Y1 * | 3/2005 ............. F25D 11/00 |
| KR | 10-0813648 | 3/2008 |
| KR | 10-2019-0023617 | 3/2019 |
| WO | WO 2018/049342 | 3/2018 |

OTHER PUBLICATIONS

Korean Office Action dated Dec. 22, 2020 issued in Application 10-2019-0057086.
KR 10-2019-0023617 Machine Translation.
JP 2017-133825 Machine Translation.
JP H08-170868 Machine Translation.
European Search Report dated Nov. 2, 2020 issued in EP Application No. 20174434.9.
Chinese Office Action dated Feb. 15, 2023 issued in Application No. 202010412667.8.

* cited by examiner

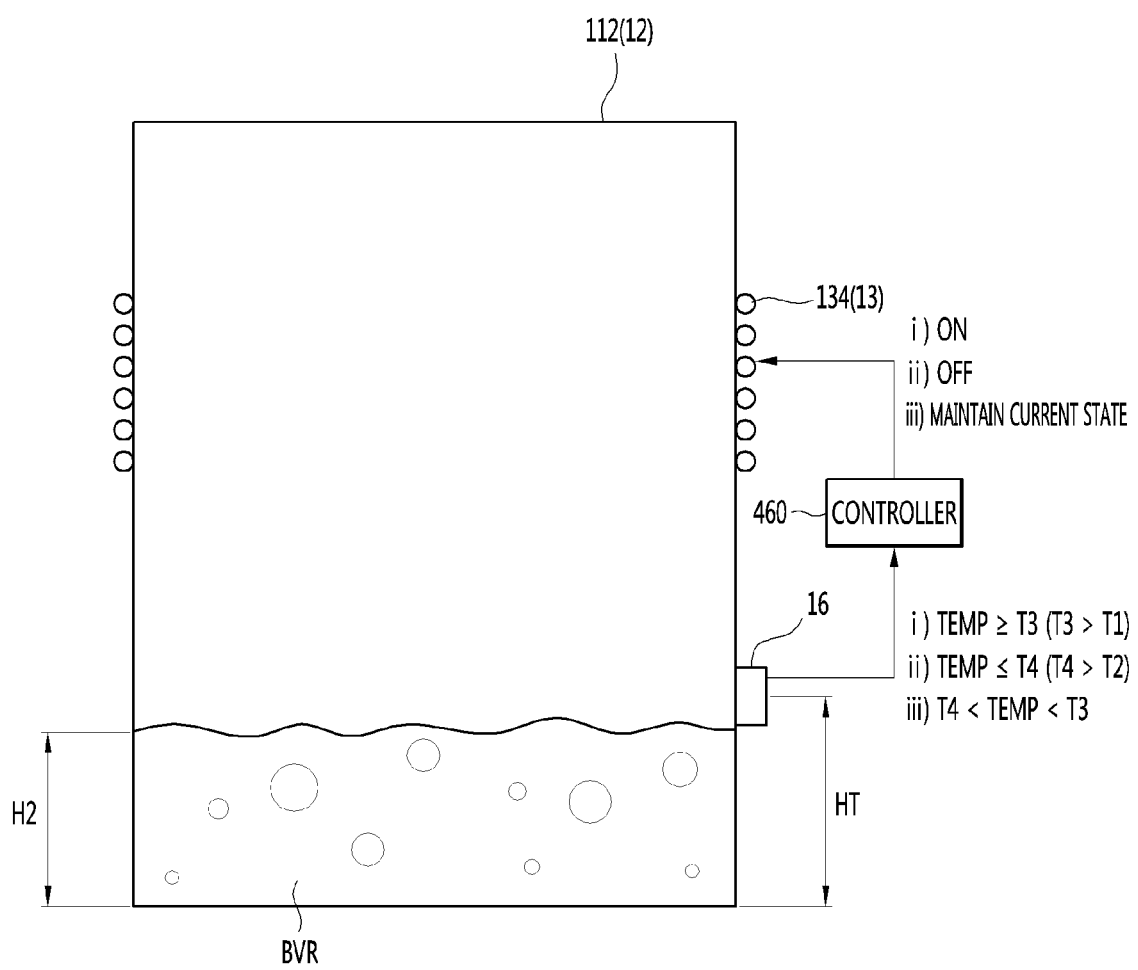

FERMENTATION AND AGING APPARATUS AND METHOD FOR CONTROLLING FERMENTATION AND AGING APPARATUS

CROSS-REFERENCE TO RELATED APPLICATION(S)

This application claims priority under 35 U.S.C. 119 and 365 to Korean Patent Application No. 10-2019-0057086, filed in Korea on May 15, 2019 in the Korean Intellectual Property Office, the disclosure of which is incorporated herein by reference.

BACKGROUND

1. Field

A fermentation and aging apparatus and a method for controlling a fermentation and aging apparatus are disclosed herein.

2. Background

Beverages are collectively referred to as drinkable liquids, such as alcohol or tea. For example, beverages may be divided into various categories, such as water (a beverage) for quenching thirst, juice beverages with a unique flavor and taste, refreshing beverages giving a refreshing sensation, favorite beverages with a stimulant effect, or alcoholic beverages with an alcohol effect.

A representative example of such a beverage is beer. Beer is an alcoholic beverage produced by making juice of malt, which is made by sprouting barley, filtering the juice, adding hop, and fermenting yeast.

Consumers may purchase ready-made products made and sold by a beer maker or may make beer at home (hereinafter "homemade" beer) produced by directly fermenting beer ingredients at home or in a bar. Homemade beer may be made in a variety of types rather than ready-made products and may be made to better suit a consumer's taste.

The ingredients for making beer may include water, liquid malt, hop, yeast, and a flavoring additive, for example. Leaven, which is called yeast, may be added to liquid malt to ferment the liquid malt and assist production of alcohol and carbonic acid. Flavor additives are additives that enhance the taste of beer, such as fruit, syrup, and vanilla beans, for example.

Generally, homemade beer may include three stages or operations, namely, a wort stage or operation, a fermentation stage or operation, and an aging stage of operation, and it may take about two to three weeks from the wort stage or operation to the aging stage or operation. Maintaining an optimum temperature during the fermentation operation is important for homemade beer, and the easier the beer is to make, the more user convenience is improved.

Recently, a fermentation and aging apparatus capable of easily making a beer-like beverage at home or in a bar has been gradually used. Such a fermentation and aging apparatus is configured to be convenient.

BRIEF DESCRIPTION OF THE DRAWINGS

Embodiments will be described in detail with reference to the following drawings in which like reference numerals refer to like elements, and wherein:

FIGS. 9 and 10 are exemplary diagrams related to the control operation of FIG. 8.

DETAILED DESCRIPTION

Figure 1:
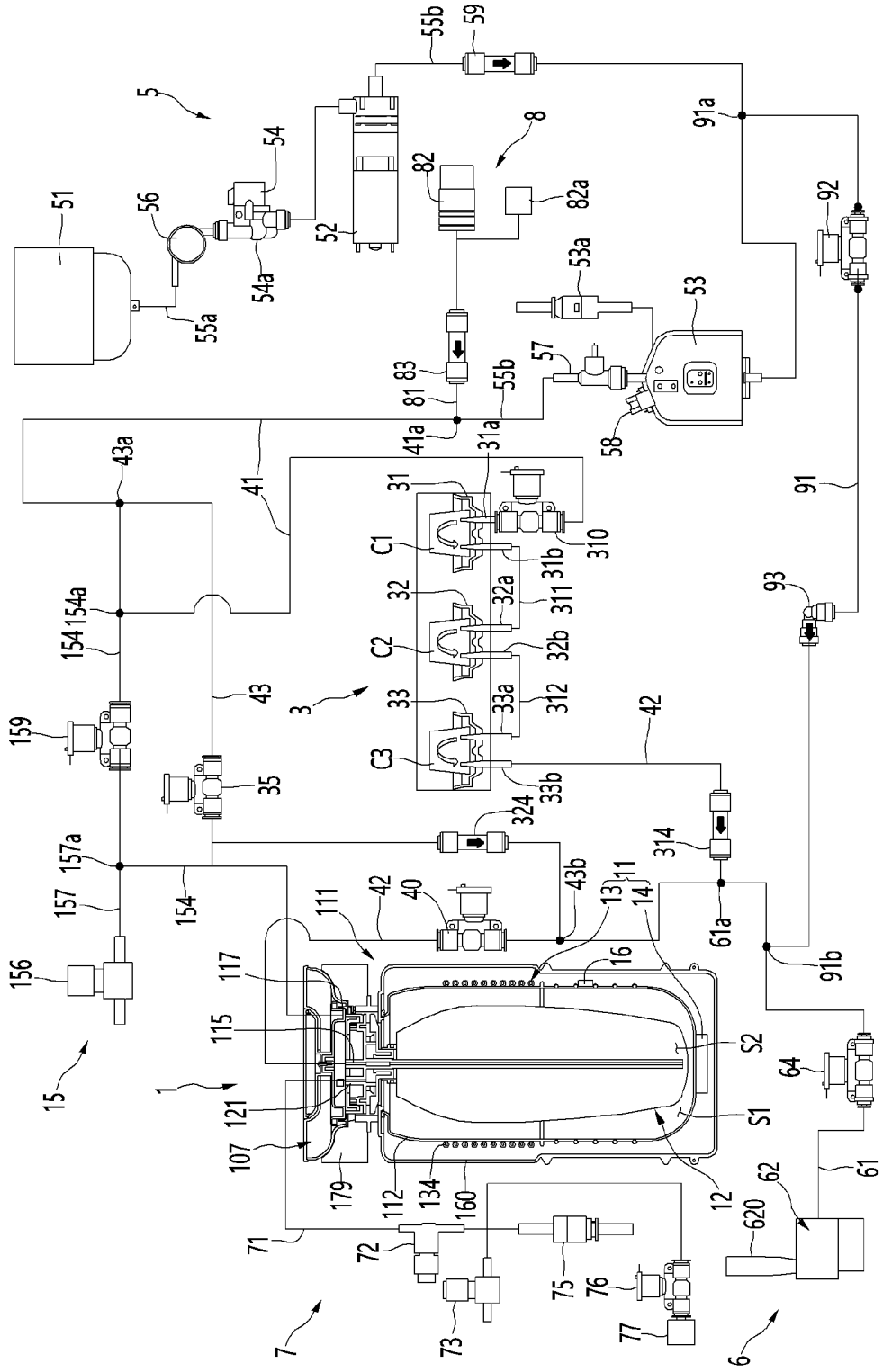
FIG. 1 is a schematic view of a fermentation and aging apparatus according to an embodiment.

Hereinafter, embodiments are described with reference to drawings. Wherever possible, like or the same reference numerals have been used to indicate like or the same elements, and repetitive disclosure has been omitted.

Although beer is exemplified as a beverage that is made using a fermentation and aging apparatus according to embodiments, the kind of beverage that can be made using the fermentation and aging apparatus is not limited to beer and various kinds of beverages may be made using the fermentation and aging apparatus according to embodiments.

FIG. 1 is a schematic view of a fermentation and aging apparatus according to an embodiment. The fermentation and aging apparatus may include a fermentation module 1. A beverage may be fermented in the fermentation module 1. The fermentation and aging apparatus may include a temperature controller that controls an inner temperature of the fermentation module 1.

The fermentation and aging apparatus may include a fluid supply module 5. The fluid supply module 5 may supply a fluid, such as water.

The fermentation and aging apparatus may include an ingredient supplier 3 provided with ingredient receivers 31, 32, and 33 in which ingredients required for making a beverage may be accommodated. The fermentation and aging apparatus may include main channels 41 and 42 that connect the fluid supply module 5 to the fermentation module 1.

The fermentation and aging apparatus may include a beverage dispenser 6 that dispenses the beverage made in the fermentation module 1 to the outside. The beverage dispenser 6 may be connected to second main channel 42. Thus, the beverage dispensed from the fermentation module 1 may be guided to the beverage dispenser 6 by passing through a portion of the second main channel 42.

The fermentation and aging apparatus may further include a gas discharger 7. The gas discharger 7 may be connected to the fermentation module 1 to discharge a gas generated while the beverage is made.

The fermentation and aging apparatus may further include an air injector 8 that injects air. The air injector 8 may be connected to the fluid supply module 5 or first main channel 41. The air injector 8 may include an air pump 82.

The fermentation and aging apparatus may further include an air controller 15 that controls a pressure between an inner wall of a fermentation tank 112 and an outer surface of a fermentation container 12. The fermentation and aging apparatus may further include a sub channel 91. The sub channel 91 may connect the fluid supply module 5 to the beverage dispenser 6.

The fermentation module 1 may include a fermentation tank module 111 having an opening, and a fermentation lid 107 that opens and closes the opening. The fermentation tank module 111 may include a fermentation case 160 and fermentation tank 112 accommodated in the fermentation case 160 and having an inner space S1. Insulation (not shown) may be provided between the fermentation case 160 and the fermentation tank 112. The fermentation tank module 111 may further include a lid seating body 179 on which the fermentation lid 107 may be seated.

Each of the fermentation case 160 and the fermentation tank 112 may be provided as an assembly of a plurality of members or components. The fermentation case 160 may define an outer appearance of the fermentation tank module 111.

The fermentation lid 107 may seal an inside of the fermentation tank module 111 and be disposed on the fermentation tank module 111 to cover the opening. A main channel, more particularly, a main channel connecting portion 115 connected to the second main channel 42 may be provided in the fermentation lid 107.

A fermentation container 12 may be accommodated in the fermentation tank 112. The fermentation container 12 may be provided as a separate container so that beverage ingredients and a finished beverage do not stain the inner wall of the fermentation tank 112. The fermentation container 12 may be separably disposed on or in the fermentation tank 112. The fermentation container 12 may be seated on or in the fermentation tank 112 to ferment the beverage within the fermentation tank 112. After the fermentation container 12 is used, the fermentation container 12 may be removed from the fermentation tank 112.

The fermentation container 12 may be a pack containing ingredients (ingredients to be fermented) for making a beverage. The fermentation container 12 may be made of a flexible material. Thus, the fermentation container 12 may be easily inserted into the fermentation tank 112 and be contracted and expanded by a pressure. However, embodiments are not limited thereto. For example, the fermentation container 12 may be made of a PET material.

The fermentation container 12 may have a beverage-making space S2 in which beverage ingredients may be accommodated, and the beverage made. The fermentation container 12 may have a size less than a size of inner space S1 of the fermentation tank 112.

The fermentation container 12 may be inserted into and accommodated in the fermentation tank 112 in a state in which the ingredients are contained in the fermentation container 12. The fermentation container 12 may be inserted into the fermentation tank 112 and then accommodated in the fermentation tank 112 in a state in which the fermentation lid 107 is opened.

The fermentation lid 107 may seal the fermentation tank 112 after the fermentation container 12 is inserted into the fermentation tank 112. The fermentation container 12 may assist fermentation of the ingredients in a state in which the fermentation container 12 is accommodated in the inner space S1 sealed by the fermentation container 112 and the fermentation lid 107. The fermentation container 12 may be expanded by pressure therein during the making of the beverage. The fermentation container 12 may be pressed by air within the fermentation tank 112 when the beverage contained in the fermentation container 12 is dispensed, and the air may be supplied between the inner surface of the fermentation tank 112 and the fermentation container 12.

The fermentation tank 112 may be disposed in the fermentation case 160. The fermentation tank 112 may have an outer circumferential surface and an outer bottom surface, which may be spaced apart from an inner surface of the fermentation case 160. The outer circumferential surface of the fermentation tank 112 may be spaced apart from an inner circumference of the fermentation case 160, and the outer bottom surface of the fermentation tank 112 may be spaced apart from an inner bottom surface of the fermentation case 160.

The insulation (not shown) may be provided between the fermentation case 160 and the fermentation tank 112. The insulation may be disposed in the fermentation case 160 to surround the fermentation tank 112. Thus, a temperature of the fermentation tank 112 may be maintained constant. The insulation may be made of a material, such as foamed polystyrene or polyurethane, which has a high thermal insulating performance and absorbs vibration.

The fermentation tank 112 may include a temperature sensor 16 that measures a temperature of the fermentation tank 112. The temperature sensor 16 may be mounted on the outer circumferential surface of the fermentation tank 112. The temperature sensor 16 may be disposed below an evaporator 134 wound around the fermentation tank 112.

A temperature controller 11 may change an inner temperature of the fermentation tank module 111. The temperature controller 11 may change a temperature of the fermentation tank 112. The temperature controller 11 may heat or cool the fermentation tank 112 to control a temperature of the fermentation tank 112 at an optimal temperature for fermenting the beverage.

The temperature controller 11 may include at least one of a refrigerant cycle device 13 and/or a heater 14. However, embodiments are not limited thereto. For example, the temperature controller 11 may include a thermoelement (TEM).

The refrigerant cycle device 13 may control the temperature of the fermentation tank 112 to cool the temperature of the fermentation tank 112. The refrigerant cycle device 13 may include a compressor, a condenser, an expansion mechanism, and the evaporator 134.

The evaporator 134 may contact the outer circumferential surface of the fermentation tank 112. The evaporator 134 may be provided as an evaporation tube wound around the outer circumferential surface of the fermentation tank 112. The evaporator 134 may be accommodated between the fermentation tank 112 and the insulation to cool the fermentation tank 112 insulated by the insulation.

The temperature controller 11 may further include heater 14 that heats the fermentation tank 112. The heater 14 may contact the outer bottom surface of the fermentation tank 112. The heater 14 may be provided as a heat generation heater that generates heat when power is applied. The heater 14 may be provided as a plate heater. Thus, natural convection of a fluid may be generated inside of the fermentation tank 112 by the evaporator 134 and the heater 14, and temperature distribution inside of the fermentation tank 112 and the fermentation container 12 may be uniform.

As described above, the main channels 41 and 42 may include first main channel 41 that connects the fluid supply module 5 to the ingredient supplier 3 and second main channel 42 that connects the ingredient supplier 3 to the fermentation module 1. That is, the first main channel 41 may guide a fluid, such as water supplied from the fluid supply module 5 to the ingredient supplier 3, and the second main channel 42 may guide a mixture of ingredients and the fluid, which are extracted from the ingredient supplier 3, to the fermentation module 1.

The first main channel 41 may have a first end 41a connected to the fluid supply module 5 and a second end connected to the ingredient supplier 3, more particularly, an inlet 31a of an initial ingredient receiver 31, which will be described hereinafter.

An ingredient supply valve 310 that opens and closes the first main channel 41 may be installed in the first main channel 41. The ingredient supply valve 310 may be provided in the ingredient supplier 3.

The ingredient supply valve 310 may be opened when additives accommodated in the ingredient receivers 31, 32, and 33 are input to open the first main channel 41. The ingredient supply valve 310 may also be opened when the ingredient receivers 31, 32, and 33 are cleaned to open the first main channel 41.

The second main channel 42 may have a first end connected to the main channel connecting portion 115 of the fermentation module 1 and a second end connected to the ingredient supplier 3, more particularly, an outlet 33b of a final ingredient receiver 33, which will be described hereinafter.

A main valve 40 that opens and closes the second main channel 42 may be installed in the second main channel 42. Also, a main check valve 314 that allows fluid to flow from the ingredient supplier 3 to the fermentation module 1 may be installed in the second main channel 42. That is, the main check valve 314 may prevent the fluid from flowing back to the ingredient supplier 3. The main check valve 314 may be disposed between the main valve 40 and the ingredient supplier 3 with respect to the second main channel 42.

The main valve 40 may be opened to open the second main channel 42 when fluid is supplied to the fermentation container 12. The main valve 40 may be closed to close the second main channel 42 while the fermentation tank 112 is cooled. The main valve 40 may be opened to open the second main channel 42 when air is injected into the fermentation container 12. The main valve 40 may be opened to open the second main channel 42 when ingredients are supplied into the fermentation container 1. The main valve 40 may be closed to seal the inside of the fermentation container 12 during fermentation of the ingredients. The main valve 40 may be closed to seal the inside of the fermentation container 12 when the beverage is aged and stored. The main valve 40 may be opened to open the second main channel 42 when the beverage is dispensed by the beverage dispenser 6. The beverage within the fermentation container 1 may pass through the main valve 40 to flow to the beverage dispenser 6.

The main channels 41 and 42 may be provided as one continuous channel when the fermentation and aging apparatus does not include the ingredient supplier 3. When the fermentation and aging apparatus includes the ingredient supplier 3, the fermentation and aging apparatus may further include bypass channel 43 configured to allow fluid or air to bypass the ingredient receivers 31 and 32.

The bypass channel 43 may bypass the ingredient receivers 31, 32, and 33 and then be connected to the first main channel 41 and the second main channel 42. The bypass channel 43 may have a first end 43a connected to the first main channel 41 and a second end 43b connected to the second main channel 42. The first end 43a of the bypass channel 43 may be connected to the first main channel 41 between the fluid supply module 5 and the ingredient supply valve 310 and the second end 43b may be connected to the second main channel 42 between the main valve 40 and the ingredient supplier 3.

A bypass valve 35 that opens and closes the bypass channel 43 may be installed in the bypass channel 43. The bypass valve 35 may be opened to open the bypass channel 43 when fluid supplied from the fluid supply module 5 is supplied to the fermentation container 12. The bypass valve 35 may be opened to open the bypass channel 43 when air injected from the air injector 8 is supplied to the fermentation container 12. The bypass valve 35 may be opened to open the bypass channel 43 when the bypass channel 43 is cleaned.

A bypass check valve 324 that allows fluid to flow from the first main channel 41 to the second main channel 42 may be installed in the bypass channel 43. That is, the fluid may flow only from the first main channel 41 to the second main channel 42, but may not flow in the opposite direction. The bypass check valve 324 may be disposed between the bypass valve 35 and the second main channel 42 with respect to the bypass channel 43.

When the beverage is made using the fermentation and aging apparatus, the ingredients for making the beverage may include a fluid, such as water, a fermentation target, and additives, for example, a fermentation accelerator. When beer is made using the fermentation and aging apparatus, ingredients for making the beer may include water, malt, yeast, hop, and flavoring additives, for example. The fermentation and aging apparatus may include all of the ingredient supplier 3 and the fermentation container 12. The ingredients for making the beverage may be accommodated separately in the ingredient supplier 3 and the fermentation container 12. That is, a portion of the ingredients, for example, ingredients to be fermented for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the fluid supplied from the fluid supply module 5 and mixed with the portion of the ingredients accommodated in the fermentation container 12.

A main ingredient (ingredients to be fermented) that is essential for making a beverage may be accommodated in the fermentation container 12, and the other ingredients or additives, for example, a fermentation accelerator, added to the main ingredient may be accommodated in the ingredient supplier 3. In this case, the additives accommodated in the ingredient supplier 3 may be mixed with fluid supplied from the fluid supply module 5 and supplied to the fermentation container 12 and then mixed with the main ingredient accommodated in the fermentation container 12.

An amount of the main ingredient accommodated in the fermentation container 12 may be greater than an amount of other ingredients. For example, when beer is made, the main material may be malt of malt, yeast, hop, and flavoring additives. Also, the additive accommodated in the ingredient supplier 3 may be the other ingredients except for the malt of the ingredients for making beer, for example, yeast, hop, and flavoring additives.

According to one embodiment, the fermentation and aging apparatus may not include the ingredient supplier 3 but may include the fermentation container 12. In this case, the main ingredient may be accommodated in the fermentation container 12, and the user may directly put the additives into the fermentation container 12.

If the fermentation and aging apparatus includes both the ingredient supplier 3 and the fermentation container 12, the beverage may be more easily made. Hereinafter, a case in which the fermentation and aging apparatus includes both the ingredient supplier 3 and the fermentation container 12 will be described as an example. However, embodiments are not limited to the case in which the fermentation and aging apparatus includes both the ingredient supplier 3 and the fermentation container 12.

The ingredients within the fermentation container 12 may be fermented over time, and the beverage made in the fermentation container 12 may flow to the second main channel 42 through the main channel connecting portion 115 and also flow from the second main channel 42 to the beverage dispenser 6 to be dispensed. The ingredients that are necessary for making the beverage may be accommodated in the ingredient supplier 3, and the fluid supplied from the fluid supply module 5 may pass through the ingredient supplier 3. For example, when the beverage made in the fermentation and aging apparatus is beer, the ingredients accommodated in the ingredient supplier 3 may be yeast, hop, and flavoring additives, for example.

The ingredients accommodated in the ingredient supplier 3 may be directly accommodated into the ingredient receivers 31, 32, and 33 provided in the ingredient supplier 3. At least one ingredient receiver 31, 32, and 33 may be provided in the ingredient supplier 3. Also, a plurality of ingredient receivers 31, 32, and 33 may be provided in the ingredient supplier 3. The plurality of ingredient receivers 31, 32, and 33 may be partitioned with respect to each other.

Inlets 31a, 32a, and 33a, through which the fluid may be introduced, and outlets 31b, 32b, and 33b, through which the fluid may be discharged, may be provided in the ingredient receivers 31, 32, and 33, respectively. The fluid introduced into the inlet of one ingredient receiver may be mixed with the ingredients within the ingredient receivers and then discharged through the outlet.

The ingredients accommodated in the ingredient supplier 3 may be accommodated in ingredient containers C1, C2, and C3. The ingredient containers C1, C2, and C3 may be accommodated in the ingredient receivers 31, 32, and 33, and each of the ingredient receivers 31, 32, and 33 may be referred to as an "ingredient container mount". The ingredient containers C1, C2, and C3 may be a capsule, or a pod, for example; however, embodiments are not limited thereto.

When the ingredients are accommodated in the ingredient containers C1, C2, and C3, the ingredient supplier 3 may be configured so that the ingredient containers C1, C2, and C3 may be seated therein and withdrawn therefrom. The ingredient supplier 3 may be provided as an ingredient container kit assembly in which the ingredient containers C1, C2, and C3 are separably accommodated.

For example, a first additive, a second additive, and a third additive may be accommodated in the ingredient supplier 3. The first additive may be a fermentation accelerator, for example, yeast, the second additive may be hop, and the third additive may be a flavoring additive. The ingredient supplier 3 may include a first ingredient container mount 31 in which a first ingredient container C1 containing the first additive may be accommodated, a second ingredient container mount 32 in which a second ingredient container C2 containing the second additive may be accommodated, and a third ingredient container mount 33 in which a third ingredient container C3 containing the third additive may be accommodated.

The ingredients contained in the ingredient receivers or the ingredient containers C1, C2, and C3 may be extracted by a fluid pressure of fluid supplied from the fluid supply module 5. When the ingredients are extracted by the fluid pressure, the fluid supplied from the fluid supply module 5 to the first main channel 41 may pass through the ingredient receivers or the ingredient containers C1, C2, and C3 and then may be mixed with the ingredients, and the ingredients accommodated in the ingredient receivers or the ingredient containers C1, C2, and C3 may flow to the second main channel together with the fluid.

A plurality of different additives may be accommodated separately in the ingredient supplier 3. For example, when beer is made, the plurality of additives accommodated in the ingredient supplier 3 may be yeast, hop, and a flavoring additive, which may be accommodated separated from each other.

When the plurality of ingredient receivers is provided in the ingredient supplier 3, the plurality of ingredient receivers 31, 32, and 33 may be connected in series to each other in a flow direction of the fluid. That is, the ingredient supplier 3 may include at least one connecting channel 311 and 312 that connects the outlet of one ingredient receiver of the plurality of ingredient receivers 31, 32, and 33 to the inlet of another ingredient receiver.

Also, the plurality of ingredient receivers 31, 32, and 33 may include an initial ingredient receiver 31 and a final ingredient receiver 33. The plurality of ingredient receivers 31, 32, and 33 may further include an intermediate ingredient receiver 32.

The inlet 31a of the initial ingredient receiver 31 may be connected to the first main channel 41, and the outlet 33b of the final ingredient receiver 33 may be connected to the second main channel 42. The intermediate ingredient receiver 32 may be disposed between the first ingredient receiver 31 and the second ingredient receiver 33 in the flow direction of the fluid. The inlet 32a and the outlet 32b of the intermediate ingredient receiver 32 may be connected to different connecting channels 311 and 312 from each other.

As illustrated in FIG. 1, when three ingredient receivers are provided in the ingredient supplier 3, the outlet 31b of the initial ingredient receiver 31 may be connected to the inlet 32a of the intermediate ingredient receiver 32 through the first connecting channel 311, and the outlet 32b of the intermediate ingredient receiver 32 may be connected to the inlet 33a of the final ingredient receiver 33 through the second connecting channel 312. The fluid introduced into the inlet 31a of the final ingredient receiver 31 through the first main channel 41 may flow to the first connecting channel 311 through the outlet 31b together with the first additive accommodated in the initial ingredient receiver 31.

The fluid, which may be a mixture of water and a first additive, introduced into the inlet 32a of the intermediate ingredient receiver 32 through the first main channel 311 may flow to the second connecting channel 312 through the outlet 32b together with the second additive accommodated in the intermediate ingredient receiver 32. The fluid, which may now be a mixture of water and first and second additives, introduced into the inlet 33a of the final ingredient receiver 33 through the second main channel 312 may flow to the second connecting channel 42 through the outlet 33b together with a third additive accommodated in the final ingredient receiver 33. The fluid, which may now be a mixture of water and first, second, and third additives, discharged through the second main channel 42 may be guided to the main channel connecting portion 115 of the fermentation module 1 and then introduced into the fermentation container 12.

However, the configuration of the ingredient supplier is not limited thereto. For example, when the intermediate ingredient receiver is not provided, two ingredient receivers may be provided in the ingredient supplier 3. In this case, one ingredient receiver may be the initial ingredient receiver, and the other ingredient receiver may be the final ingredient receiver. The outlet of the initial ingredient receiver and the inlet of the final ingredient receiver may be connected to each other by the connecting channel.

For another example, when a plurality of the intermediate ingredient receiver is provided, four or more ingredient receivers may be provided in the ingredient supplier 3. In this case, one ingredient receiver may be the initial ingredient receiver, another ingredient receiver may be the final ingredient receiver, and the remaining ingredient receivers may be intermediate ingredient receivers. In this case, as the connection between the ingredient receivers in series is easily understood by a person skilled in the art, detailed descriptions thereof have been omitted.

As the plurality of ingredient receivers 31, 32, and 33 may be connected in series to each other, the channel configuration of the ingredient supplier 3 may be simplified. Further, as the additives contained in the ingredient containers C1, C2, and C3 may be extracted all at once, a time taken to extract the additives may decrease. Furthermore, as the user does not have to worry about a mounting order of the ingredient containers C1, C2, and C3, malfunction due to the mounting of the ingredient containers C1, C2, and C3 in an erroneous order may not occur. Also, fluid leakage in the ingredient supplier 3 may be minimized to improve reliability.

When the ingredients accommodated in the ingredient supplier 3 are accommodated in the ingredient containers C1, C2, and C3, the initial ingredient receiver 31 may be referred to as an "initial ingredient container mount", the intermediate ingredient receiver 32 may be referred to as an "intermediate ingredient container mount", and the final ingredient receiver 33 may be referred to as a "final ingredient container mount".

That is, as the fermentation and aging apparatus uses the fermentation container 12 and the ingredient containers C1, C2, and C3, amounts of the ingredients necessary for making the beverage are accurately provided, thereby providing uniform quality for the beverage. In addition, as the fermentation container 12 and the ingredient containers C1, C2, and C3 are implemented to facilitate separation and mounting, sanitary conditions inside and outside of the apparatus may be improved.

The fluid supply module 5 may include a tank 51, a pump 52 that pumps a fluid, such as water within the tank 51, and a heater 53 that heats the fluid pumped by the pump 52. The tank 51 and the pump 52 may be connected to a tank discharge channel 55a, and the fluid contained in the tank 51 may be introduced into the pump 52 through the tank discharge channel 55a.

The pump 52 and a first end of the first main channel 41 may be connected to a supply channel 55b, and the fluid discharged from the pump 52 may be guided to the first main channel 41 through the supply channel 55b. A flow meter 56 that measures a flow rate of the fluid discharged from the tank 51 may be installed in the tank discharge channel 55a.

A flow rate control valve 54 that controls a flow rate of the fluid discharged from the tank 51 may be installed in the tank discharge channel 55a. The flow rate control valve 54 may include a step motor.

A thermistor 54a that measures a temperature of the fluid discharged from the tank 51 may be installed in the tank discharge channel 55a. The thermistor 54a may be built into the flow rate control valve 54.

A check valve 59 that prevents the fluid from flowing back to the pump 52 may be installed in the supply channel 55b. Also, the heater 53 may be installed in the supply channel 55b. A thermal fuse 58 that interrupts a circuit to cutoff current applied to the heater 53 when a temperature is high may be installed in the heater 53.

The fluid supply module 5 may further include a safety valve 53a. The safety valve 53a may communicate with an inside of a heater case of the heater 53. The safety valve 53a may restrict a maximum inner pressure of the heater case. For example, the safety valve 53a may restrict the maximum inner pressure of the heater case to a pressure of about 3.0 bar.

The fluid supply module 5 may further include a temperature sensor 57 that measures a temperature of the fluid passing through the heater 53. The temperature sensor 57 may be installed in the heater 53. Alternatively, the temperature sensor 57 may be disposed at a portion of the supply channel 55b behind the heater 53 in the flow direction of fluid. Also, the temperature sensor 57 may be installed in the first main channel 41.

When the pump 52 is driven, the fluid within the tank 51 may be introduced into the pump 52 through the tank discharge channel 55a. The fluid discharged from the pump 52 may be heated in the heater 53 while flowing through the supply channel 55b and then be guided to the first main channel 41.

The beverage dispenser 6 may be connected to the second main channel 42. The beverage dispenser 6 may include a dispenser 62 that dispenses a finished beverage and a beverage dispensing channel 61 that connects to the dispenser 62 to the second main channel 42.

The beverage dispensing channel 61 may have a first end (connecting portion) 61a connected between the main check valve 314 and the main valve 40 with respect to the second main channel 42 and a second end connected to the dispenser 62. A beverage dispensing valve 64 that opens and closes the beverage dispensing channel 61 may be installed in the beverage dispensing channel 61.

The beverage dispensing valve 64 may be opened to open the beverage dispensing channel 61 when the beverage is dispensed. The beverage dispensing valve 64 may be opened to open the beverage dispensing channel 61 when residual fluid is removed. The beverage dispensing valve 64 may be opened to open the beverage dispensing channel 61 when the beverage dispenser is cleaned.

An anti-foaming portion (not shown) may be provided in the beverage dispensing channel 61, and an amount of foam of the beverage flowing from the second main passage 42 to the beverage dispensing channel 61 may be minimized while passing through the anti-foaming portion. A mesh that filters the foam may be provided in the anti-foaming portion (not shown).

When the beverage is dispensed, the beverage dispensing valve 64 may be opened. When the beverage is not dispensed, the beverage dispensing valve 64 may be maintained in a closed state.

The gas discharger 7 may be connected to the fermentation module 1 to discharge gas generated in the fermentacontainer 12. The gas discharger 7 may include a gas discharge channel 71 connected to the fermentation module 1, a gas pressure sensor 72 installed in the gas discharge channel 71, and a gas discharge valve 73 connected upstream of the gas pressure sensor 72 in the gas discharge channel 71 in a gas discharge direction.

The gas discharge channel 71 may be connected to the fermentation module 1, more particularly, the fermentation lid 107. A gas discharge channel connecting portion 121 to which the gas discharge channel 71 may be connected may be provided in the fermentation lid 107.

Gas within the fermentation container 12 may flow into the gas discharge channel 71 and the gas pressure sensor 72 through the gas discharge channel connecting portion 121. The gas pressure sensor 72 may detect a pressure of the gas discharged to the gas discharge channel 71 through the gas discharge channel connecting portion 121 within the fermentation container 12.

The gas discharge valve 73 may be opened when air is injected into the fermentation container 12 by the air injector 8. The fermentation and aging apparatus may uniformly mix the malt with the fluid by injecting air into the fermentation container 12. Foam generated in the liquid malt may be discharged from an upper portion of the fermentation container 12 to the outside through the gas discharge channel 71 and the gas discharge valve 73. The gas discharge valve 73 may be opened during the fermentation operation and then closed.

The gas discharger 7 may further include a safety valve 75 connected to the gas discharge channel 71. The safety valve 75 may be connected upstream of the gas pressure sensor 72 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76. The pressure release valve 76 may be connected to the gas discharge channel 71. The pressure release valve 76 and the gas discharge valve 73 may be selectively opened/closed. The gas discharge channel 71 may be branched to be respectively connected to the gas discharge valve 73 and the pressure release valve 76.

A noise reducing device 77 may be mounted on the pressure release valve 76. The noise reducing device 77 may include at least one of an orifice structure or a muffler structure, for example.

Even though the pressure release valve 76 is opened, an inner pressure of the fermentation container 12 may gradually decrease due to the noise reducing device 77. When fermentation of the beverage progresses, the pressure release valve 76 may be opened to release the pressure in a state in which the inner pressure of the fermentation container 12 increases. The noise reducing device 77 may effectively reduce noise generated due to a difference in pressure between the inside and outside of the fermentation container 12. The pressure release valve 76 may be open/close-controlled in a fermentation operation with relatively high internal pressure. That is, the fermentation and aging apparatus may effectively discharge unnecessary gas generated during the fermentation operation through the gas discharger 7.

The air injector 8 may be connected to the supply channel 55b or the first main channel 41 to inject air. Hereinafter, for convenience of description, a case in which the air injector 8 is connected to the supply channel 55b will be described as an example.

The air injector 8 may be connected to an opposite side of sub channel 91, which will be described hereinafter, with respect to the heater 53. The air injected by the air injector 8 may pass through the heater 53 to flow to the sub channel 91 together with residual fluid within the heater 53. Thus, residual fluid within the heater 53 may be removed to maintain a clean state of the heater 53.

Alternatively, air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, air injected from the air injector 8 to the first main channel 41 may be guided to the ingredient supplier 3 to flow to the ingredient container mounts 31, 32, and 33. Residual fluid or residue within the ingredient containers C1, C2, and C3 or the ingredient container mounts 31, 32, and 33 may flow to the second main channel 42 due to air injected by the air injector 8. The ingredient containers C1, C2, and C3 and the ingredient container mounts 31, 32, and 33 may be cleanly maintained by the air injected by the air injector 8.

The air injector 8 may include an air injection channel 81 connected to the supply channel 55b or the first main channel 41 and an air pump 82 connected to the air injection channel 81. The air pump 82 may pump air to the air injection channel 81. An air injection check valve 83 that prevents fluid flowing to the supply channel 55b by the pump 52 from being introduced into the air pump 82 through the air injection channel 81 may be installed in the air injection channel 81.

The air injector 8 may further include an air filter 82a. The air filter 82a may be provided in a suction portion of the air pump 82, and thus, external air may be suctioned into the air pump 82 by passing through the air filter 82a. Thus, the air pump 82 may inject clean air into the air injection channel 81. That is, as the fermentation and aging apparatus is provided with the air injector 8, it is possible to smoothly supply air required for growth of microorganisms during the fermentation operation of the beverage The air controller 15 may control a pressure between the inner wall of the fermentation tank 112 and the outer surface of the fermentation container 12. The air controller 15 may supply air into a space between the fermentation container 12 and the fermentation tank 112. On the other hand, the air controller 15 may exhaust the air within the space between the fermentation container 12 and the fermentation tank 112 to the outside.

The air controller 15 may include an air supply channel 154 connected to the fermentation module 1, and an exhaust channel 157 connected to the air supply channel 154 to exhaust the air to the outside. The air supply channel 154 may have a first end connected to the first main channel 41 and a second end connected to the fermentation module 1.

The air supply channel 154 may be connected to the fermentation module 1, more particularly, the fermentation lid 107. An air supply channel connecting portion 117 to which the air supply channel 154 may be connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154. The air injector 8 may function as an air supplier that supplies air into the space between the fermentation container 12 and the fermentation tank 112 together with the air supply channel 154.

As described above, the air supplied into the fermentation tank 112 may press the fermentation container 12 between the outer surface of the fermentation container 12 and the inner wall of the fermentation tank 112. The beverage within the fermentation container 12 may be pressed by the fermentation container 12 pressed by the air. When the main valve 40 and the beverage dispensing valve 64 are opened, the beverage may pass through the main channel connecting portion 115 to flow to the second main channel 42. The beverage flowing from the fermentation container 12 to the second main channel 42 may be dispensed to the outside through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may occur between the fermentation container 12 and the fermentation tank 112.

The air pump 82 may be maintained in an off state while the beverage is dispensed. When the beverage is completely dispensed, the air pump 82 may be driven for a next beverage dispensing and then stopped.

Thus, when the beverage is finished, the fermentation and aging apparatus may dispense the beverage within the fermentation container 12 to the beverage dispenser 6 in a state in which the fermentation container 1 is disposed within the fermentation module 1 without withdrawing the fermentation container 12 to the outside of the fermentation module 1.

The air controller 15 may include a separate air supply pump with respect to the air injector 8. In this case, the air supply channel 154 may be connected to the air supply pump, but may not be connected to the first main channel 41. However, injection of air into the fermentation container 12 by the air pump 82 and the supplying of air into the space between the fermentation container 12 and the fermentation tank 112 may be combined with each other to realize a compact product and reduce manufacturing costs.

The exhaust channel 157 may function as an air exhaust passage, through which the air between the fermentation container 12 and the fermentation tank 112 may be exhausted to the outside, together with a portion of the air supply channel 154. The exhaust channel 157 may be disposed outside of the fermentation module 1. The exhaust channel 157 may be connected to a portion of the air supply channel 154, which is disposed outside of the fermentation tank 112.

The air supply channel 154 may include a first channel connected between a connecting portion 157a connected to the first main channel 41 and the exhaust channel 157 and a second channel connected between the connecting portion 154a connected to the exhaust channel 157 and the air supply channel connecting portion 117. The first channel may be an air supply channel that guides the air pumped by the air pump 82 to the second channel. Also, the second channel may be an air supply and exhaust-combined channel that supplies the air passing through the air supply channel into the space between the fermentation tank 112 and the fermentation container 12 or guides the air discharged from the space between the fermentation tank 112 and the fermentation container 12 the connecting channel 157.

The exhaust channel 157 may be connected to an exhaust valve 156 that opens and closes the exhaust channel 157. The exhaust valve 156 may be opened so that the air between the fermentation container 12 and the fermentation tank 112 may be exhausted to the outside when the fermentation container 12 is expanded while the beverage is made. The exhaust valve 156 may be opened when the fluid is supplied by the fluid supply module 5. The exhaust valve 156 may be opened when the air is injected by the air injector 8.

The exhaust valve 156 may be opened so that the air between the fermentation container 12 and the fermentation tank 112 may be exhausted when the beverage within the fermentation container 12 is completely dispensed. The user may take the fermentation container 12 out of the fermentation tank 112 when the beverage is completely dispensed. This is done because safety accidents occur when the inside of the fermentation tank 112 is maintained at a high pressure. The exhaust valve 156 may be opened when the beverage within the fermentation container 12 is completely dispensed.

The air controller 15 may further include an air supply valve 159 that restricts the air pumped by the air pump 82 and supplied between the fermentation container 12 and the fermentation tank 112. The air supply valve 159 may be installed in the air supply channel 154. That is, the air supply valve 159 may be installed between the connecting portion 154a of the first main channel 41 and the connecting portion 157a of the exhaust channel 157 in the air supply channel 154.

The sub channel 91 may connect the fluid supply module 5 to the beverage dispenser 6. That is, the sub channel 91 may have a first end 91a connected to the supply channel 55b and a second end 91b connected to the beverage dispensing channel 61.

The sub channel 91 may be connected between the pump 52 and the heater 53 with respect to the supply channel 55b. Also, the sub channel 91 may be connected to the connecting portion 61a of the second main channel 42 and the beverage dispensing valve 64 with respect to the beverage dispensing channel 61.

The fluid supplied by the pump 52 and the air pumped by the air pump 82 may be guided to the beverage dispensing channel 61 through the sub channel 91 and then may be dispensed to the dispenser 62. Thus, residual fluid or beverage remaining in the beverage dispenser 6 may be removed.

A sub valve 92 that opens and closes the sub channel 91 may be installed in the sub channel 91. The sub valve 92 may be opened to open the sub channel 91 when the beverage is dispensed, or cleaning is performed.

A sub check valve 93 that prevents the beverage in the beverage dispensing channel 61 from flowing back to the fluid supply module 5 may be installed in the sub channel 91. The sub check valve 93 may be disposed between the sub valve 92 and the beverage dispensing channel 61 with respect to the sub channel 91.

The sub channel 91 may function as a residual fluid removing channel of the fluid supply module 5. For example, when the air pump 82 is turned on in a state in which the air supply valve 159, the bypass valve 35, and the ingredient supply valve 310 are closed, the sub valve 92 is opened, and the air injected into the air injection channel 81 may pass through the heater 53 to flow to the sub channel 91. Then, the air may pass through the sub valve 92 to flow to the beverage dispensing channel 61 and then be dispensed to the dispenser 62. In this operation, the air may be dispensed together with fluid from the fluid supply module 5, more particularly, the residual fluid remaining in the heater 53 and the supply channel 55*b* so that residual fluid may be removed.

In addition, the sub channel 91 may function as a cleaning channel. That is, a beverage may be partially dispensed by the dispenser 62, and when a long period of time has elapsed before a next beverage dispensing, fluid may flow to the sub channel 91 to clean the dispenser 62 before the next beverage dispensing is performed.

Figure 2:
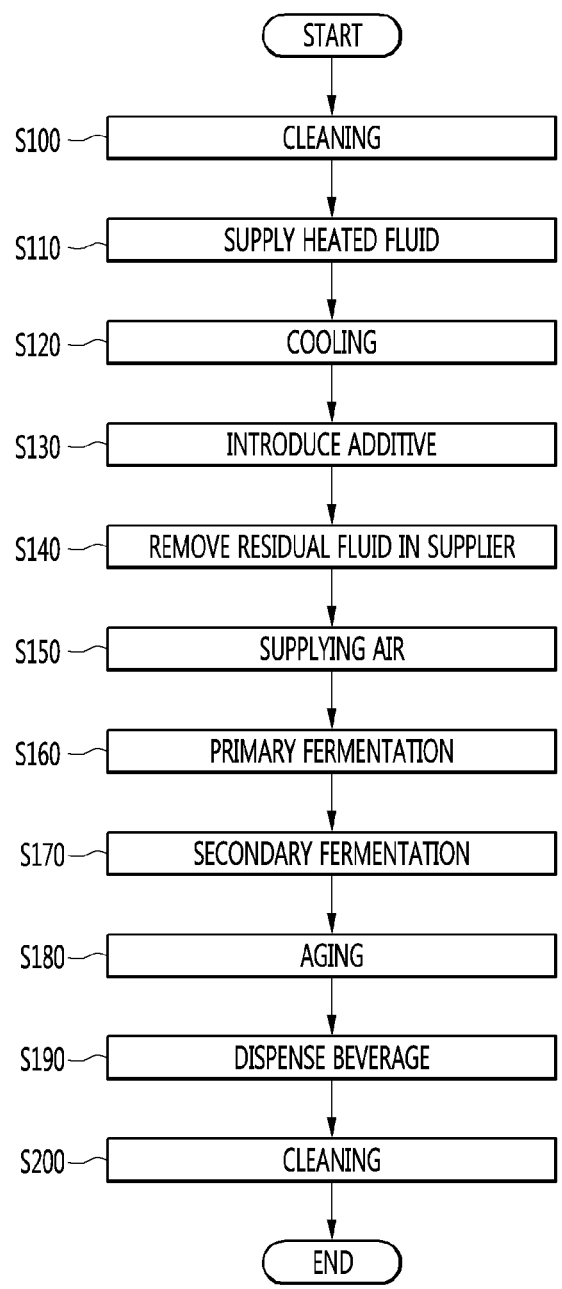
FIG. 2 is a flowchart of a method for controlling a fermentation and aging apparatus according to an embodiment.

FIG. 2 is a flowchart of a method for controlling a fermentation and aging apparatus according to an embodiment. The fermentation and aging apparatus according to this embodiment may include cleaning operations (S100 and S200) for cleaning the channels. The cleaning operations (S100 and S200) may be separately performed with respect to a beverage making operation. The cleaning operations (S100 and S200) may be performed before and after the beverage making operation.

Also, the cleaning operations (S100 and S200) may be performed by a user input during the beverage making operation. In this case, like a primary fermentation operation (S160) or a secondary fermentation operation (S170), which will be described hereinafter, the cleaning operations (S100 and S200) may be performed while the channel connected to the fermentation module 1 is closed, and the ingredients are not contained in the ingredient supplier 3.

The cleaning operations (S100 and S200) may be performed in a state in which the ingredient containers are accommodated in the ingredient supplier 3, and the fermentation container 12 is accommodated in the fermentation module 1. The user may input a cleaning command through an input unit 420 (referring to FIG. 4), a remote controller, or a portable terminal. A controller 460 may control the fermentation and aging apparatus to perform the cleaning operations (S100 and S200) according to the input of the cleaning command.

Also, the user may input a beverage making command through the input unit 420, a remote controller, or a portable terminal. The controller 460 may control the fermentation and aging apparatus to perform the cleaning operations (S100 and S200) before and after the beverage making operation according to the input of the beverage making operation.

The controller 460 may supply a fluid, such as water of the tank 51 to the inner channels and the ingredient supplier 3 in the cleaning operation. The supplied fluid may be discharged to the outside through the dispenser 62 together with foreign matter or residue present in the channels and the ingredient supplier 3.

In the fermentation and aging apparatus, the cleaning operation may be performed during a predetermined cleaning time. After the predetermined cleaning time, the cleaning operation may be completed. As the cleaning process is provided, internal contamination or propagation of microorganisms in the fermentation and aging apparatus may be prevented.

The beverage making operation of making a beverage may be performed in the fermentation and aging apparatus according to this embodiment. The user may seat the fermentation container 12 on or in the fermentation module 1 for the beverage making operation. In this case, some (for example, malt) of ingredients may be received in the fermentation container 12. The malt may be received in the form of malt oil.

The user may insert the plurality of ingredient containers C1, C2, and C3 into the ingredient supplier 3 before or after the fermentation container 12 is seated. The user may input the beverage making command through the input unit 420, the remote controller, or the mobile terminal. The controller 460 may control the fermentation and aging apparatus to perform the beverage making operation according to the input of the beverage making command.

The beverage making operation may include a fluid supply operation (S110). The fluid supply operation (S110) may be a liquid malt formation operation of mixing the malt in the fermentation container 12 with heated fluid to form liquid malt.

The controller 460 may turn on the pump 52 to introduce the fluid from the tank 51 into the fermentation container 12, in the fluid supply operation (S110). According to an embodiment, to introduce heated fluid into the fermentation container 12, the fluid supply module 5 may further include the heater 53. The fluid discharged from the tank 51 may pass through the pump 52, may flow to the heater 53, and may be heated by the heater 53. Fluid heated by the heater 53 may be introduced into the fermentation container 12 through a channel between the fluid supply module 5 and the fermentation module 1. The heated fluid introduced into the fermentation container 12 may be mixed with the malt contained in the fermentation container 12, and the malt in the fermentation container 12 may be mixed with the fluid and gradually diluted. As the heated fluid is supplied to the fermentation container 12, the malt accommodated in the fermentation container 12 may be quickly uniformly mixed with the heated fluid.

The controller 460 may perform the fluid supply operation (S110) until an amount of accumulated fluid detected by the flow meter 56 reaches a target flow rate, and when the amount of accumulated fluid detected by the flow meter 56 reaches the target flow rate, the fluid supply operation (S110) may be ended. When the fluid supply operation (S110) is complete, the controller 460 may turn off the pump 52 and the heater 53.

The beverage making operation may include a fermentation tank cooling operation (S120). When the fluid supply operation (S110) is complete, the fermentation tank cooling operation (S120) for cooling the fermentation tank 112 or the fermentation container 12 may be performed.

The controller 460 may control the temperature controller 11 to cool the fermentation container 12. The controller 460 may control the refrigerant cycle device 3 to cool the fermentation container 12. When the refrigerant cycle device 3 is driven, the fermentation container 12 may be gradually cooled, and also, the liquid malt accommodated in the fermentation container 12 may be cooled. The controller 460 may control the refrigerant cycle device 13 according to the temperature sensed by the temperature sensor 16 installed in the fermentation module 1.

The beverage making operation may include an additive introducing operation (S130). The fermentation and aging apparatus may perform the additive introducing operation (S130) while performing the cooling operation (S120). For example, the fermentation and aging apparatus may perform the additive introducing operation (S130), when the temperature sensed by the temperature sensor 16 reaches a specific temperature value higher than the cooling temperature set for the cooling operation (S120).

In the additive introducing operation (S130), ingredients received in the ingredient supplier 3 may be introduced into the fermentation container 12. The controller 460 may turn on the pump 52. When the pump 52 is turned on, the fluid in the tank 51 may be introduced into the ingredient supplier 3 by passing through the pump 52 and a channel between the fluid supply module 5 and the ingredient supplier 3. Fluid introduced into the ingredient supplier 3 may be mixed with the ingredient contained in the ingredient supplier 3 and introduced into the fermentation container 12 together with the ingredient.

The controller 460 may complete the additive introducing operation (S130) when the accumulated flow rate detected by the flow meter 56 reaches the additive introduction target flow rate from a start of the additive introducing operation (S130). When the additive introducing operation (S130) is completed, the controller 460 may turn off the pump 52.

The beverage making operation may include an ingredient supplier residual fluid removing operation (S140). When the additive introducing operation (S130) is complete, the ingredient supplier residual fluid removing operation (S140) of removing residual fluid from the ingredient supplier 3 may be performed.

In the ingredient supplier residual fluid removing operation (S140), the controller 460 may turn on the air pump 82. When the air pump 82 is turned on, air may be introduced into the ingredient supplier 3 through a channel between the air pump 82 and the ingredient supplier 3. The air introduced into the ingredient supplier 3 may push residual fluid in the ingredient supplier 3 into a channel between the ingredient supplier 3 and the fermentation module 1. The air flowing into the channel may be introduced into the fermentation container 12 together with the residual fluid. Accordingly, ingredients and fluid, which are not extracted, but remain in the ingredient supplier 3, may be entirely introduced into the fermentation container 12.

The controller 460 may turn on the air pump 82 for a predetermined residual fluid removal time and may end the ingredient supplier residual fluid removing operation (S140) after the predetermined residual fluid removal time has elapsed. When the ingredient supplier residual fluid removing operation (S140) is complete, the controller 460 may turn on the air pump 82.

The beverage making operation may further include an air supplying operation (S150). The fermentation and aging apparatus may complete the cooling operation (S120) when the temperature sensed by the temperature sensor 16 is equal to or less than a cooling temperature at least one time after the cooling operation (S120) is commenced and the refrigerant cycle device is turned on. The fermentation and aging apparatus may perform the air supplying operation (S150) of supplying air into the fermentation container 12 to mix liquid malt, after the cooling operation (S120) is completed.

In the air supplying operation (S150), the controller 460 may turn on the air pump 82. While the air pump 82 is in an ON state, the air may be introduced into the fermentation container 12 by passing through the channel between the air pump 82 and the fermentation module 1. The air introduced into the fermentation container 12 as described above may collide with the liquid malt to help the malt be more uniformly mixed with the heated fluid. In addition, the air colliding with the liquid malt may supply oxygen to the liquid malt. In other words, stirring and aeration may be performed.

The controller 460 may turn on the air pump 82 and may mix the air with the liquid malt for a predetermined mixing time, and may complete the air supplying operation (S150) when the predetermined mixing time has elapsed after the air pump 82 is turned on. In the air supplying operation (S150), the controller 460 may turn off the air pump 82.

The beverage making operation may include the fermentation operation (S160 and S170). The fermentation operation may include the primary fermentation operation (S160) and the secondary fermentation operation (S170).

The controller 460 may control the temperature controller 11 such that the temperature measured by the temperature sensor 16 is maintained at a primary fermentation target temperature in the primary fermentation operation. The controller 460 may periodically open or close the gas discharge valve 73 that opens or closes a channel between the fermentation container 12 and the outside, and may store the pressure sensed by the gas pressure sensor 72 in a memory 450 while the gas discharge valve 73 is closed. The controller 460 may complete the primary fermentation operation (S160), when a variation in pressure periodically sensed by the gas pressure sensor exceeds a primary fermentation reference pressure variation.

The controller 460 may commence the secondary fermentation operation (S170) after the primary fermentation operation (S160) is completed. The controller 460 may control the temperature controller 11 such that the temperature measured by the temperature sensor 16 becomes a secondary fermentation target temperature in the secondary fermentation operation (S170). The secondary fermentation target temperature may be equal to the first fermentation target temperature; however, embodiments are not limited thereto.

The controller 460 may open and close the gas discharge valve 73 based on the inner pressure of the fermentation tank 112 after the secondary fermentation operation (S170) is commenced. When the variation in the pressure sensed by the gas pressure sensor 72 exceeds a secondary fermentation pressure variation, or when the secondary fermentation progress time exceeds the predetermined secondary fermentation time, the controller 460 may determine that the secondary fermentation is completed and may end the secondary fermentation operation (S170).

Alternatively, the controller 460 may open and close the gas discharge valve 73 such that the inner pressure of the fermentation tank 112 is maintained to be within a secondary fermentation pressure range for the predetermined secondary fermentation time. The controller 460 may complete the secondary fermentation operation (S170) when the predetermined secondary fermentation time has elapsed. That is, the fermentation and aging apparatus may naturally produce carbonic acid in the beverage through the secondary fermentation process.

The beverage making operation may include an aging operation (S180). When the primary fermentation operation (S160) and the secondary fermentation operation (S170) are completed, the aging operation (S180) may be performed.

The controller 460 may stand by for an aging time in the aging operation (S180), and may control the temperature controller 11 such that the temperature of the beverage is maintained between an upper limit and a lower limit of a target aging temperature for the aging time.

When the aging time has elapsed, the beverage is completely made. However, if necessary, the aging operation (S180) may be omitted and the beverage making may be completed when the secondary fermentation operation (S170) is completed.

Figure 4:
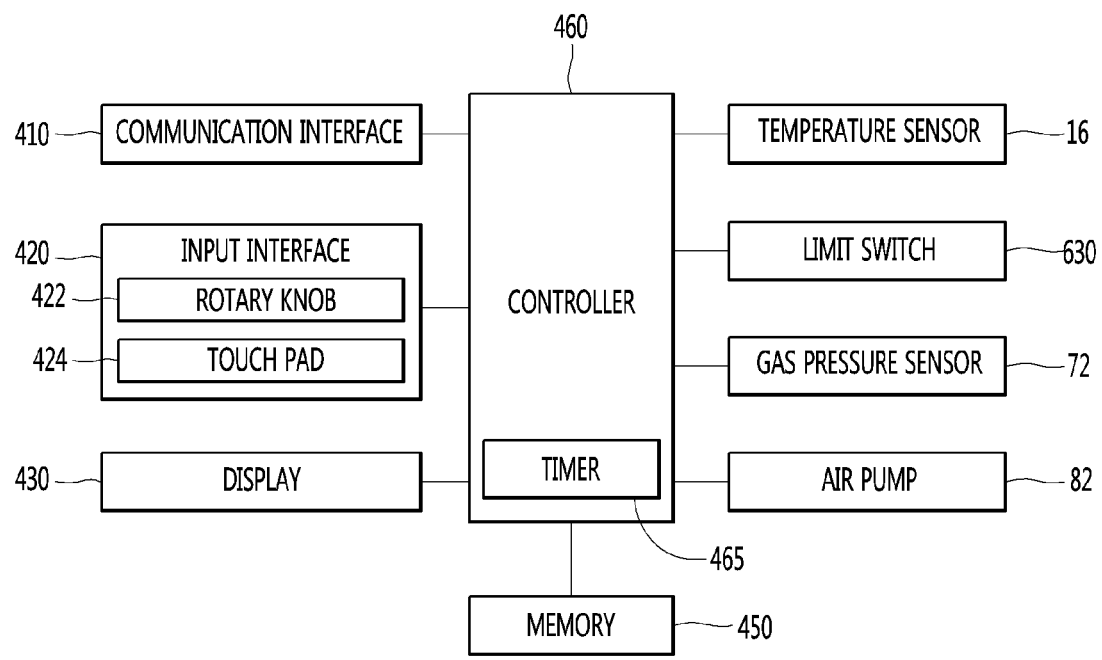
FIG. 4 is a schematic block diagram for controlling a fermentation and aging apparatus according to an embodiment.

The controller 460 may display that the beverage making is completed, through a display 430 (see FIG. 4). In addition, the controller 460 may guide the user with information associated with the beverage making process through a communication interface 410 or the display 430. Accordingly, the user may conveniently check the beverage making process and easily make the beverage through the fermentation and aging apparatus by itself.

The controller 460 may maintain the temperature of the fermentation container 12 between an upper limit and a lower limit of a target drinking temperature until a beverage dispensing operation (S190) to be described hereinafter is completed.

According to an embodiment, the fermentation and aging apparatus may further perform the beverage dispensing operation (S190) of dispensing a beverage after the beverage is completely made. In the beverage dispensing operation (S190), the user may dispense a beverage by operating the dispenser 62. When the user opens the dispenser 62, the beverage in the fermentation container 12 may be dispensed through the dispenser 62 after passing through the channel between the fermentation module 1 and the dispenser 62.

The user may dispense the beverage at least once through the dispenser 62. In other words, the beverage dispensing operation may be performed at least once, and the controller 460 may determine whether the beverage dispensing is completed by using information, such as a time during which the dispenser 62 is opened.

When the controller 460 determines that all of the beverage in the fermentation container 12 is dispensed, and thus, the beverage dispensing operation is completed, the controller 460 may further perform a cleaning operation (S200) after the beverage making operation and the beverage dispensing operation. The cleaning operation (S200) may be similar to the cleaning operation (S100) before the beverage making operation.

Figure 3:
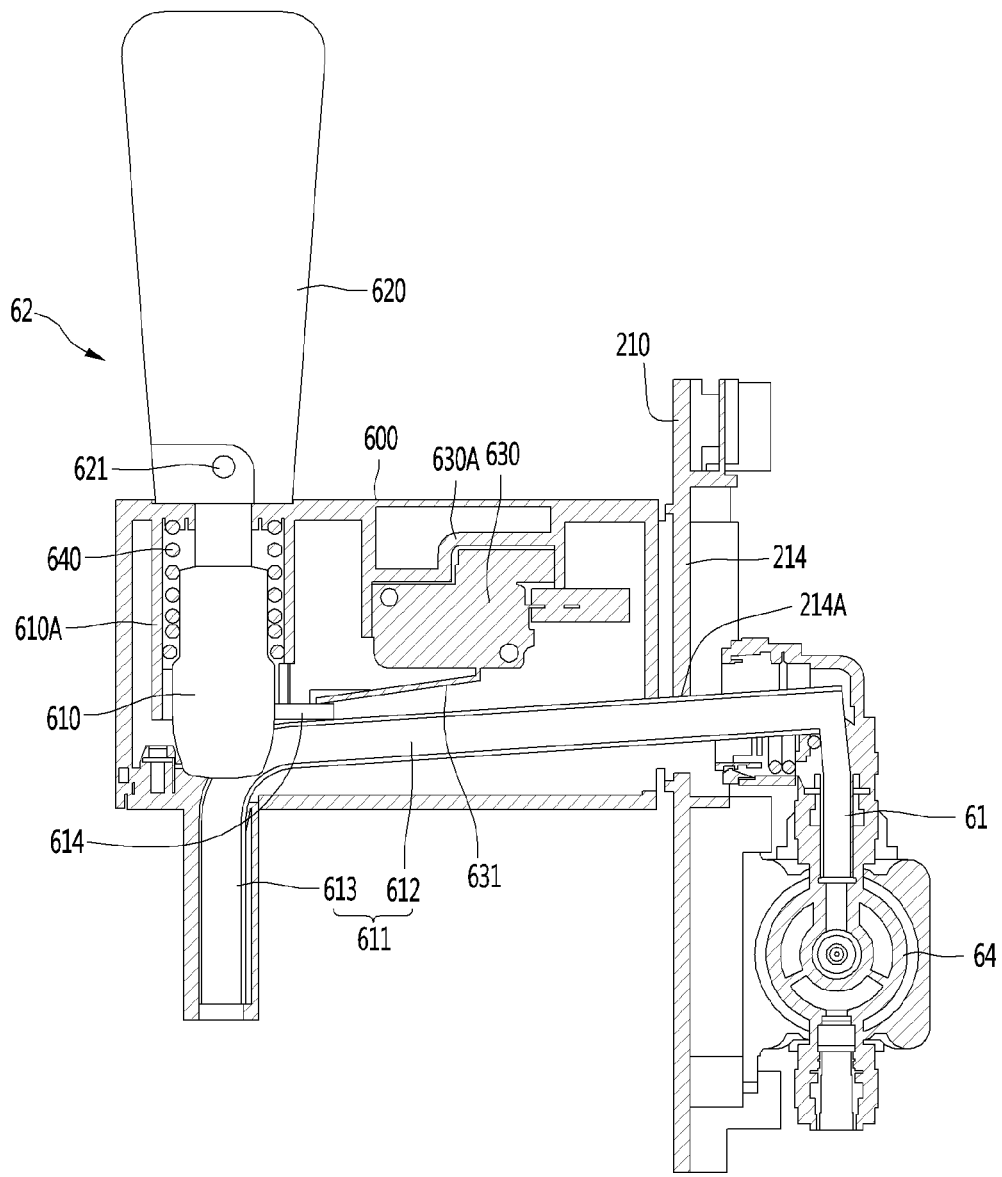
FIG. 3 is a cross-sectional view of a beverage dispenser of the fermentation and aging apparatus according to an embodiment.

FIG. 3 is a cross-sectional view illustrating a beverage dispenser of the fermentation and aging apparatus according to an embodiment. The dispenser 62 of the beverage dispenser 6 (see FIG. 1) may include a dispenser body 600, an elevating body 610, a lever 620, and a limit switch 630.

A dispenser channel 611 connected to a beverage dispensing channel 61 may be formed in the dispenser body 600. The elevating body 610 may be disposed to elevate inside of the dispenser body 600. The lever 620 may be rotatably connected to the upper portion of the elevating body 610 to elevate the elevating body 610 during a rotation operation. The limit switch 630 may be switched by the elevating body 610.

The dispenser 62 may further include a valve spring 640 embedded in the dispenser body 600 to elastically press the elevating body 610 downward. The dispenser body 600 may be mounted to a dispensing valve mounting portion 214 formed in a center cover 210.

The dispenser channel 611 may include a first dispenser channel 612 formed to be slanted along the dispenser body 600, and a second dispenser channel 613 formed to be bent downward from a tip of the first dispenser channel 612. The beverage guided to the beverage dispensing channel 61 may sequentially pass through the first dispenser channel 612 and the second dispenser channel 613 when the elevating body 610 is opened, and then drop to a lower side of the second dispenser channel 613.

A channel accommodation space in which the dispenser channel 611 is accommodated may be defined in the dispenser body 600.

The elevating body 610 may include an operation protrusion 614 protruding to contact a terminal 631 of the limit switch 630 when the elevating body 610 is raised. When the elevating body 610 is raised, the terminal 631 of the limit switch 630 may be contacted by the operation protrusion 614. When the elevating body 610 is lowered, the terminal 631 of the limit switch 630 may be released.

The dispenser body 600 may be provided with a guide portion 610A that guides the elevating body 610 up and down. The lever 620 may be connected to a hinge 621 at an upper portion of the elevating body 610. The lever 620 may be vertically erected or horizontally laid down in a state of being connected to the elevating body 610.

When the lever 620 is horizontally laid down, the elevating body 610 may be raised to turn on the limit switch 630. When the lever 620 is vertically erected, the elevating body 610 may be lowered to turn off the limit switch 630.

The limit switch 630 may be electrically connected to the controller 460, and the controller 460 may control the fermentation and aging apparatus according to the on and off of the limit switch 630. When the user operates the lever 620 in a direction of opening the dispenser 62, the elevating body 610 may be raised, the limit switch 630 may be contacted, and the controller 460 may detect the opening of the dispenser 62. In contrast, when the user operates the lever 620 in a direction of closing the dispenser 62, the elevating body 610 may be lowered, the limit switch 630 may be released, and the controller 460 may detect the closing of the dispenser 62. The dispenser body 600 may be provided with a switch mounting portion 630A on which the limit switch 630 may be mounted.

The valve spring 640 may be disposed inside of the guide portion 610A of the dispenser body 600 and may elastically press the elevating body 610 downward. On the other hand, the beverage dispensing valve 64 of the beverage dispenser 6 may be coupled to a rear surface of the center cover 210.

FIG. 4 is a schematic block diagram illustrating components for controlling a fermentation and aging apparatus according to an embodiment. The components for controlling the fermentation and aging apparatus, which are illustrated in FIG. 4, are not essential components to realize the fermentation and aging apparatus. Accordingly, the fermentation and aging apparatus according to embodiments may include more or less components.

Referring to FIG. 4, the fermentation and aging apparatus may include communication interface 410 to communicate with a terminal, such as a smart phone or a tablet PC, for example, or a server, for example. For example, the controller 460 may receive a request for performing a function of making a beverage from a terminal of the user or recipe information through the communication interface 410. In addition, the controller 460 may transmit various pieces of information, such as an operation of the fermentation and aging apparatus, a beverage making state, and a storage state of the beverage, for example, to the terminal or the server through the communication interface 410.

The communication interface 410 may include a module to support at least one of various wireless/wired communication schemes, which are well known. For example, the communication interface 410 may include a short-range wireless communication module, such as Bluetooth or Near Field Communication (NFC), or a wireless Internet module, such as a wireless local area network (WLAN) module. For example, the NFC module may obtain recipe information corresponding to a beverage preparation pack or a beverage preparation kit from a NFC tag as the NFC tag included in the beverage preparation pack or the beverage preparation kit approaches within a predetermined distance.

The input interface 420 may be configured to receive various requests or commands from a user. For example, the input interface 420 may include a rotary knob 422, a touch pad 424 (or a touch screen), other buttons, and/or a microphone, for example. The controller 460 may receive a request for execution of a beverage making function, recipe information, and control commands for various operations of the fermentation and aging apparatus through the input interface 420, for example.

In addition, the controller 460 may receive a setting input for the storage temperature of the beverage being accommodated in the fermentation tank 112 through the input interface 420. The controller 460 may set and adjust the storage temperature according to the received input.

According to an embodiment, the fermentation and aging apparatus may further include a code recognizer to obtain recipe information. For example, the code recognizer may be implemented with a quick response (QR) code recognizer to recognize a QR code included in a beverage preparation pack or a beverage preparation kit, and obtain recipe information corresponding to the recognized QR code.

The display 430 may output various pieces of information associated with an operation or state of the fermentation and aging apparatus and various pieces of information associated with the beverage which is being made or stored in the fermentation and aging apparatus. The display 430 may be implemented with a liquid crystal display (LCD), a light emitting diode (LED), and/or an organic light emitting diode (OLED) display, for example.

For example, the display 430 may output the information in a graphic form or a text form. The fermentation and aging apparatus may further include a speaker to output the information in the form of a voice. The controller 460 may output the information through various combinations of a graphic, a text, and/or voice using the display 430 and the speaker.

The memory 450 may store various pieces of information or data associated with the operation of the fermentation and aging apparatus. For example, the memory 450 may store recipe information for beverages that may be made or various program data for the operation of the fermentation and aging apparatus. In addition, the memory 450 may store various graphic data associated with screens displayed through the display 430.

In addition, the memory 450 may store values for making beverages corresponding to multiple pieces of recipe information. For example, the values for making the beverages may include a cooling temperature described with reference to FIG. 2, a primary fermentation target temperature, a primary fermentation reference pressure variation, a secondary fermentation target temperature, a secondary fermentation pressure range, or a secondary fermentation time. In addition, the memory 450 may store an algorithm for calculating the dispensed amount and remaining amount of the beverage based on the on time of the limit switch 630 of the beverage dispenser 6 and the pressure measured by the gas pressure sensor 72.

The controller 460 may control an overall operation of the fermentation and aging apparatus. In this case, the controller 460 may refer to at least one controller. The at least one controller may be implemented in hardware, such as a CPU, an application processor, a microcomputer, an integrated circuit, and/or an application specific integrated circuit (ASIC), for example.

In the cooling operation (S120) or the fermentation operations (S160 and S170), the controller 460 may control the temperature controller 11 based on the temperature sensed by the temperature sensor 16 so as to adjust the temperature of the fermentation tank 112 to a set or predetermined temperature. As described above, the temperature controller 11 may include refrigerant cycle device 13 to cool the fermentation tank 112 and heater 14 to heat the fermentation tank 112.

The controller 460 may control the gas pressure sensor 72 so as to measure the inner pressure of the fermentation tank 112 in the fermentation operations (S160 and S170). In addition, in the fermentation operations (S160 and S170), for example, the controller 460 may control the gas discharge valve 73 so as to adjust the inner pressure of the fermentation tank 112 or discharge the gas containing off-flavor generated during fermentation to the outside.

On the other hand, when the limit switch 630 is turned on as the lever 620 is operated to dispense the beverage, the controller 460 according to an embodiment may measure a time during which the limit switch 630 is turned on using a timer 465. In addition, the controller 460 may measure the pressure using the gas pressure sensor 72 in a state in which the limit switch 630 is turned on. The controller 460 may calculate the dispensed amount and remaining amount of the beverage according to the measured time and pressure using the algorithm stored in the memory 450.

In addition, when the calculated remaining amount is lower than a reference amount, the controller 460 may reset the storage temperature to prevent an increase in operation rate of the refrigerant cycle device 13 and prevent supercooling of the beverage. This will be described hereinafter with reference to FIGS. 5 to 10.

Figure 5:
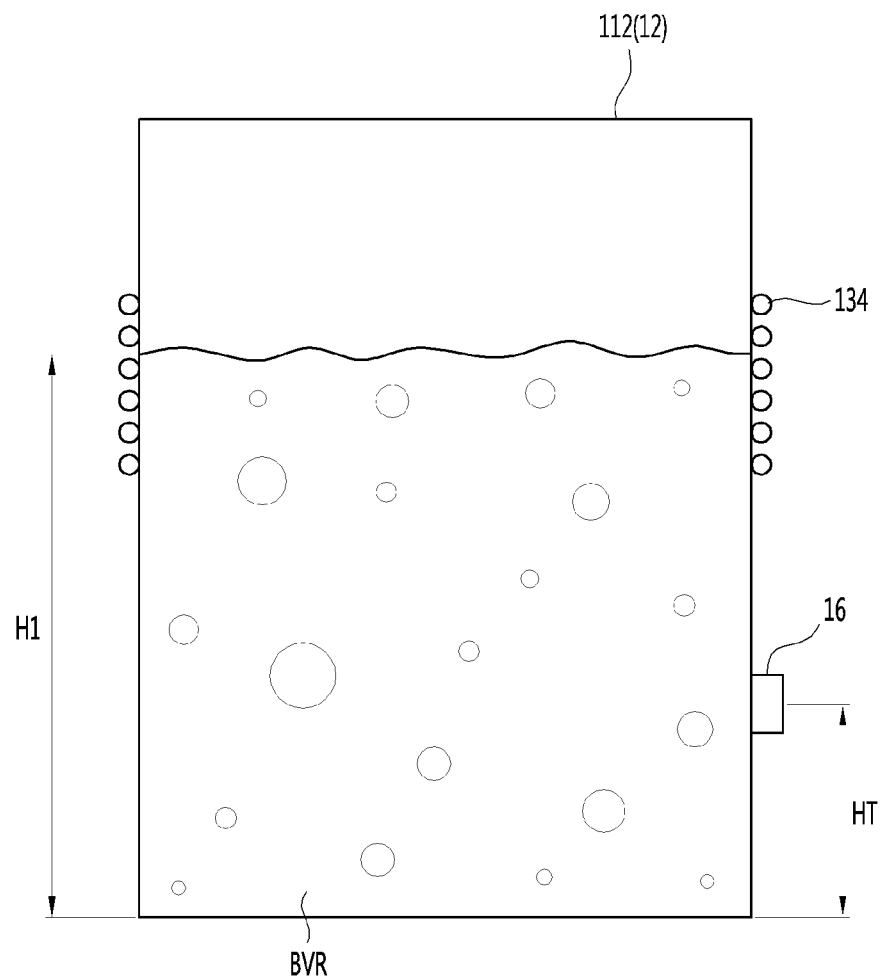
FIGS. 5 to 6 are exemplary views for explaining a problem occurring when a remaining amount of a beverage is reduced according to arrangement positions of an evaporator and a temperature sensor provided in the fermentation and aging apparatus.
Figure 6:
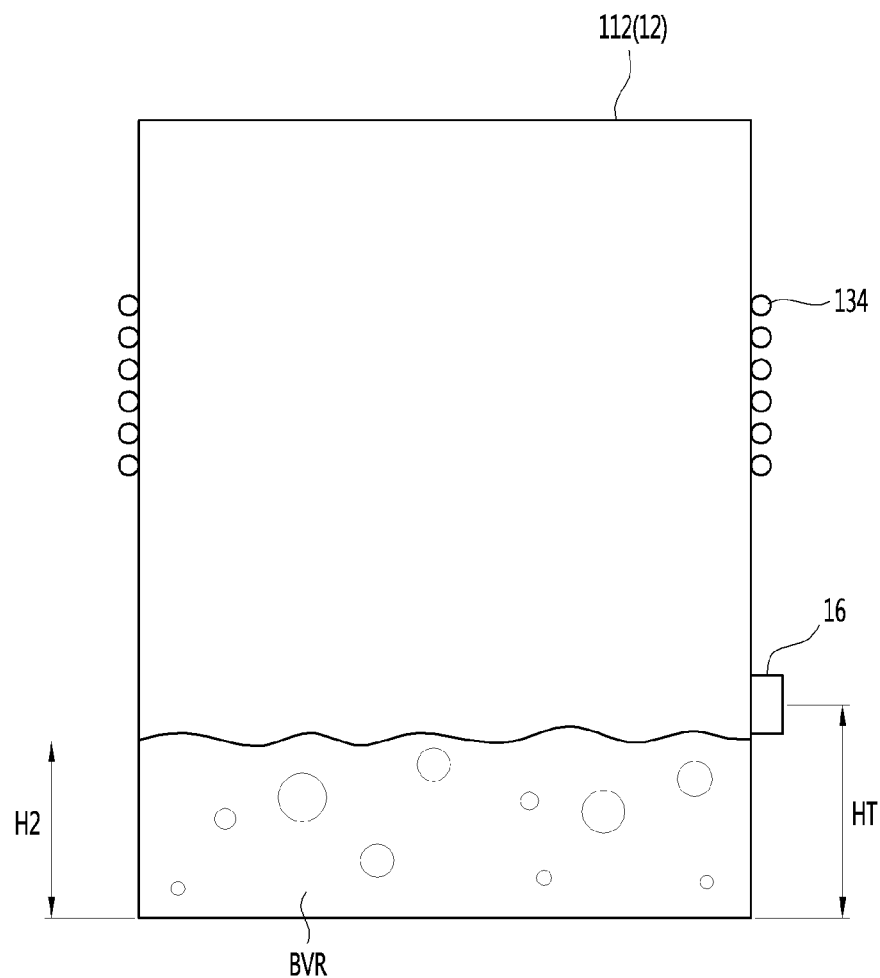

FIGS. 5 to 6 are exemplary views for explaining a problem occurring when a remaining amount of a beverage is reduced according to arrangement positions of an evaporator and a temperature sensor provided in the fermentation and aging apparatus. Referring to FIGS. 5 and 6, the fermentation and aging apparatus according to embodiments may include fermentation tank 112 defining a space in which a beverage is accommodated, refrigerant cycle device 13 configured to cool the fermentation tank 112, and temperature sensor 16 mounted on the outer circumferential surface of the fermentation tank 112 to sense a temperature. The beverage may be accommodated directly in the fermentation tank 112 or may be stored in the fermentation container 12 introduced into the fermentation tank 112.

The refrigerant cycle device 13 may cool the fermentation tank 112 to adjust the temperature of the fermentation tank 112 and the temperature of the beverage accommodated therein. The refrigerant cycle device 13 may include a compressor, a condenser, an expansion mechanism, and evaporator 134.

The evaporator 134 may be an evaporation tube wound around the outer circumferential surface of the fermentation tank 112. That is, as the refrigerant moves into and through the evaporator 134, the fermentation tank 112 may be cooled and the beverage may be cooled by heat conduction (or convection) from the fermentation tank 112 to the beverage. In order to more evenly cool the beverage according to a convection phenomenon, the evaporator 134 may be located at a position closer to an upper surface than a lower surface of the fermentation tank 112.

The temperature sensor 16 may be mounted on the outer circumferential surface of the fermentation tank 112. In addition, the temperature sensor 16 may be positioned to be spaced apart from the evaporator 134 and the heater 14 so as to prevent false detection by each of the evaporator 134 and the heater 14 (see FIG. 1).

As the temperature sensor 16 is mounted on the outer circumferential surface of the fermentation tank 112, the temperature actually measured by the temperature sensor 16 may be the temperature of the fermentation tank 112. In this case, a difference may occur between the temperature of the beverage BVR and the temperature of the fermentation tank 112 according to the remaining amount of the beverage BVR accommodated in the fermentation container 12.

As illustrated in FIG. 5, when a height H1 of the remaining amount of the beverage BVR accommodated in the fermentation container 12 is higher than a height HT of the temperature sensor 16, that is, when the remaining amount of the beverage BVR is larger than a predetermined reference amount, the beverage BVR is present in the fermentation tank 112 at a point at which the temperature sensor 16 is mounted. Therefore, a difference between the temperature sensed by the temperature sensor 16 and the temperature of the beverage BVR may be small. Accordingly, the controller 460 may drive the refrigerant cycle device 13 based on the temperature sensed by the temperature sensor 16 so as to maintain the temperature of the beverage BVR in a set or predetermined storage temperature range.

On the other hand, referring to FIG. 6, when a height H2 according to the remaining amount of the beverage BVR accommodated in the fermentation container 12 is lower than the height HT of the temperature sensor 16, that is, when the remaining amount of the beverage BVR is smaller than the predetermined reference amount, the beverage BVR is not present in the fermentation tank 112 at the point at which the temperature sensor 16 is mounted.

Therefore, the difference between the temperature sensed by the temperature sensor 16 and the temperature of the beverage BVR may be larger than in FIG. 5. In general, a specific heat of a liquid is greater than a specific heat of a solid. Therefore, when driving of the refrigerant cycle device 13 is stopped, the temperature of the fermentation tank 112 may rise faster than the temperature of the beverage BVR. Thus, even when the temperature of the beverage BVR is in the storage temperature range, the temperature sensed by the temperature sensor 16 may be higher than the storage temperature range. As a result, the operation rate and a number of interruptions of the refrigerant cycle device 13 may increase as compared with FIG. 5. As the refrigerant cycle device 13 is operated, the beverage BVR having a temperature within the storage temperature range may be cooled and the beverage BVR may be supercooled.

A method for controlling the fermentation and aging apparatus for solving the above problems will be described hereinafter with reference to FIGS. 7 to 10.

Figure 7:
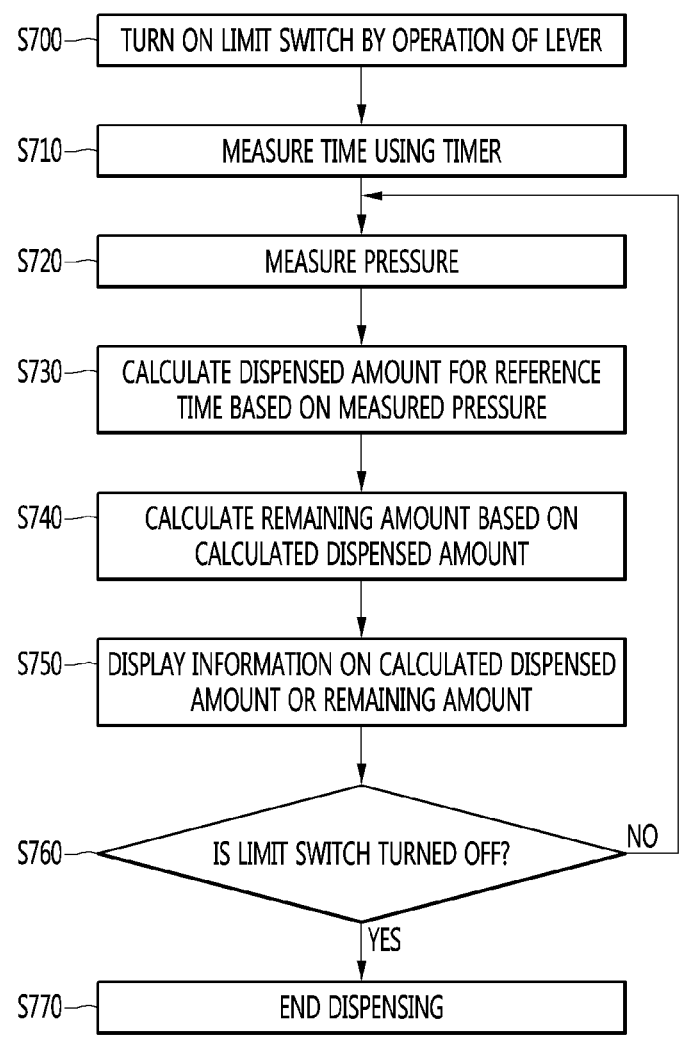
FIG. 7 is a flowchart for explaining a beverage dispensed amount and remaining amount calculation operation of the fermentation and aging apparatus according to an embodiment.

FIG. 7 is a flowchart for explaining a beverage dispensed amount and remaining amount calculation operation of the fermentation and aging apparatus according to an embodiment. In the case of embodiments, as a beverage having a different ingredient from water passes through the channel between the fermentation module 1 and the beverage dispenser 6, it may be difficult to provide a separate flow rate sensor in the channel. Therefore, the fermentation and aging apparatus can calculate (estimate) the dispensed amount and remaining amount of the beverage by the following method.

Referring to FIG. 7, when the limit switch 630 is turned on by the lever 620 operated by the user (S700), the fermentation and aging apparatus may measure the dispensing time using the timer 465 (S710). When the user wants to drink the beverage accommodated in the fermentation container 12 of the fermentation and aging apparatus, the lever 620 may be operated, for example, the lever 620 may be horizontally laid down.

The controller 460 may detect that the limit switch 630 is turned on by the operation of the lever 620. When detecting that the limit switch 630 is turned on, the controller 460 may open the beverage dispensing valve 64 so as to open the beverage dispensing channel 61 such that the beverage may be dispensed through the dispenser 62.

According to an embodiment, when a plurality of valves is disposed between the fermentation module 1 and the dispenser 62, the controller 460 may open the plurality of valves. Therefore, the beverage accommodated in the fermentation container 12 may be moved to the dispenser 62 and dispensed to the outside.

In addition, when the controller 460 detects that the limit switch 630 is turned on, the controller 460 may control the timer 465 to measure the dispensing time. The fermentation and aging apparatus may measure the inner pressure of the fermentation container 12 using the gas pressure sensor 72 (S720).

The controller 460 may control the gas pressure sensor 72 during the dispensing of the beverage to measure the inner pressure of the fermentation container 12. For example, the controller 460 may control the gas pressure sensor 72 to measure the pressure every reference time based on the dispensing time measured by the timer 465.

On the other hand, as the beverage is dispensed, the inner pressure of the fermentation container 12 may gradually decrease. When the inner pressure of the fermentation container 12 is lowered below a predetermined pressure, the beverage in the fermentation container 12 may not be smoothly dispensed. Therefore, when the measured pressure is equal to or less than a first reference pressure, the controller 460 may drive the air pump 82 to inject air into the space between the fermentation container 12 and the fermentation tank 112. In order to allow the air to be injected into the space, the controller 460 may close the bypass valve 35 and the ingredient supply valve 310 and open the air supply valve 159. As the air is injected into the space between the fermentation container 12 and the fermentation tank 112, the fermentation container 12 may be pressed to reduce its volume, and the pressure in the fermentation container 12 may be increased again. The controller 460 may turn off the air pump 82 when the measured pressure is equal to or greater than a second reference pressure which is higher than the first reference pressure.

The fermentation and aging apparatus may calculate the dispensed amount for the reference time based on the measured pressure (S730) and may calculate the remaining amount based on the calculated dispensed amount (S740). The memory 450 may store an algorithm that calculates the dispensed amount during the reference time according to the measured pressure. The algorithm may differ depending on a performance or model of the fermentation and aging apparatus.

The controller 460 may calculate the dispensed amount during the reference time, for example, 1 second, using the measured pressure and the algorithm. For example, the controller 460 may calculate an average pressure between the currently measured pressure and the pressure measured before the reference time and may calculate the dispensed amount for the reference time using the calculated average pressure. The memory 450 may store an algorithm for calculating the dispensed amount for the reference time according to the average pressure, and the controller 460 may calculate the dispensed amount using the algorithm and the average pressure.

In addition, the controller 460 may calculate the remaining amount of the beverage based on the calculated dispensed amount. For example, the controller 460 may newly calculate the remaining amount of the beverage based on the difference between the remaining amount according to the stored remaining amount information and the calculated dispensed amount, based on the remaining amount information stored in the memory 450, and may update the remaining amount information stored in the memory 450.

The fermentation and aging apparatus may display information on the calculated dispensed amount or remaining amount through the display 430 (S750). The controller 460 may display the information on the calculated dispensed amount or remaining amount in real time through the display 430 during the dispensing of the beverage. Alternatively, after the dispensing of the beverage is completed, the controller 460 may display the information on the dispensed amount or the remaining amount through the display 430.

When the limit switch 630 is turned off by the lever 620 operated by the user (YES in S760), the fermentation and aging apparatus may end the beverage dispensing operation (S770). When the user wants to end the dispensing of the beverage, the user may operate the lever 620, that is, erect the lever 620.

The controller 460 may detect that the limit switch 630 is turned off by the operation of the lever 620. When it is detected that the limit switch 630 is turned off, the controller 460 may close the beverage dispensing valve 64 so as to end the dispensing of the beverage. According to an embodiment, the controller 460 may close a plurality of valves between the fermentation module 1 and the dispenser 62.

In addition, when it is detected that the limit switch 630 is turned off, the controller 460 may detect the pressure using the gas pressure sensor 72, and calculate the dispensed amount and the remaining amount based on the time between the previous pressure detection time point and the current pressure detection time point and the detected pressure. On the other hand, while the limit switch 630 maintains the on state (NO in S760), the controller 460 may continuously calculate the dispensed amount and the remaining amount for each reference time according to operations S720 to S750.

Figure 8:
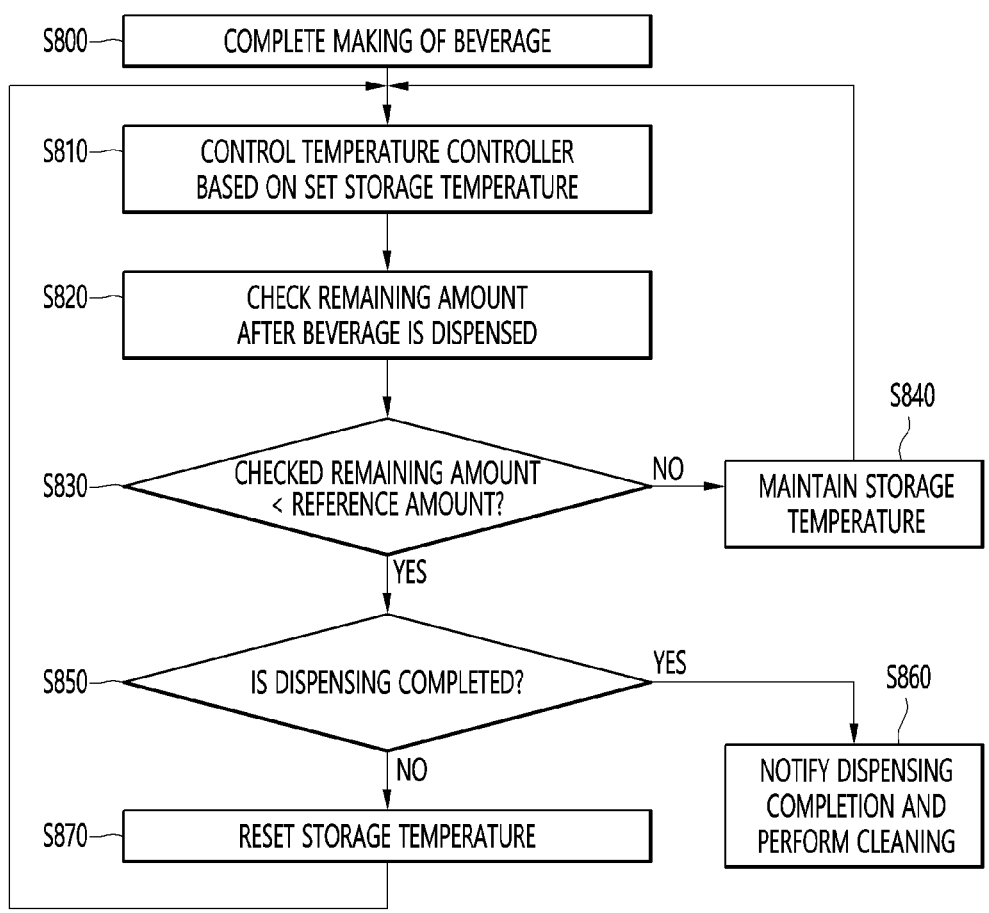
FIG. 8 is a flowchart for explaining a control operation of the fermentation and aging apparatus according to an embodiment.

FIG. 8 is a flowchart for explaining a control operation of the fermentation and aging apparatus according to an embodiment. Referring to FIG. 8, when the making of the beverage is completed according to the embodiment shown in FIG. 2 (S800), the fermentation and aging apparatus may control the temperature controller 11 based on the set or predetermined storage temperature (S810). As the making of the beverage is completed, the produced beverage may be stored in fermentation tank 112, and more exactly, the fermentation container 12.

The controller 460 may control the temperature controller 11 to adjust the temperature of the beverage based on the set or predetermined storage temperature. More specifically, when the temperature measured by the temperature sensor 16 is equal to or greater than the upper limit of the storage temperature, the controller 460 may drive the compressor of the refrigerant cycle device 13. As the compressor is driven, the refrigerant moves to the evaporator 134, and the beverage accommodated in the fermentation tank 112 may be cooled according to heat exchange between the evaporator 134 and the fermentation tank 112.

When the temperature measured by the temperature sensor 16 is equal to or less than the lower limit of the storage temperature, the controller 460 may stop driving the compressor of the refrigerant cycle device 13. Therefore, the controller 460 may maintain the temperature of the beverage in the range between the upper limit and the lower limit of the storage temperature.

The fermentation and aging apparatus may check the remaining amount of the beverage after the beverage in storage is dispensed (S820). As described above with reference to FIG. 7, the fermentation and aging apparatus may calculate the dispensed amount and the remaining amount at the time of dispensing the beverage.

When the checked remaining amount is the reference amount or more (NO in S830), the fermentation and aging apparatus may maintain the currently set storage temperature (S840). The reference amount may refer to the remaining amount of beverage when the height of the beverage accommodated in the fermentation tank 112 or the fermentation container 12 is the height HT of the temperature sensor 16. That is, the reference amount may be variously changed according to a shape or structure of the fermentation and aging apparatus, and/or a mounting position of the temperature sensor 16, for example.

When the checked remaining amount is the reference amount or more, the beverage is present at the height at which the temperature sensor 16 is mounted. Therefore, the temperature measured by the temperature sensor 16 and the actual temperature of the beverage may be similar or equal to each other. Therefore, the controller 460 may maintain the currently set storage temperature range.

On the other hand, when the remaining amount is less than the reference amount (YES of S830), the fermentation and aging apparatus may check whether the dispensing of the beverage is completed (S850). For example, when the checked remaining amount is 0 or the checked remaining amount is equal to or less than a preset or predetermined dispensing completion remaining amount, the controller 460 may confirm that the dispensing of the beverage is completed.

That is, when completion of the dispensing is confirmed (YES of S850), the fermentation and aging apparatus may notify completion of the dispensing through the display 430, for example, and may stop driving of the refrigerant cycle device 13. The fermentation and aging apparatus may perform the cleaning step (S200) after the beverage dispensing described above with reference to FIG. 2.

On the other hand, when the checked remaining amount is not zero or the checked remaining amount is larger than the preset or predetermined dispensing completion remaining amount, the controller 460 may confirm that dispensing of the beverage has not been completed. That is, when it is confirmed that the remaining amount is less than the reference amount and the dispensing of the beverage has not been completed (NO in S850), the fermentation and aging apparatus may reset the storage temperature (S870).

When the remaining amount of the beverage is less than the reference amount, the height of the beverage accommodated in the fermentation tank 112 or the fermentation container 12 may be lower than the height HT of the temperature sensor 16. In this case, as no beverage is present at the height at which the temperature sensor 16 is mounted, the difference between the temperature measured by the temperature sensor 16 and the actual temperature of the beverage may be greater than when the remaining amount is the reference amount or more. As described above with reference to FIGS. 5 and 6, when the remaining amount is less than the reference amount, the temperature measured by the temperature sensor 16 may be higher than the temperature of the beverage.

Therefore, when the remaining amount of the beverage is less than the reference amount, the controller 460 may perform resetting by increasing each of the upper limit and the lower limit of the storage temperature, thereby reducing the operation rate and the number of interruptions of the refrigerant cycle device 13. As the operation rate of the refrigerant cycle device 13 is reduced, supercooling of the beverage may be prevented.

Figure 9:
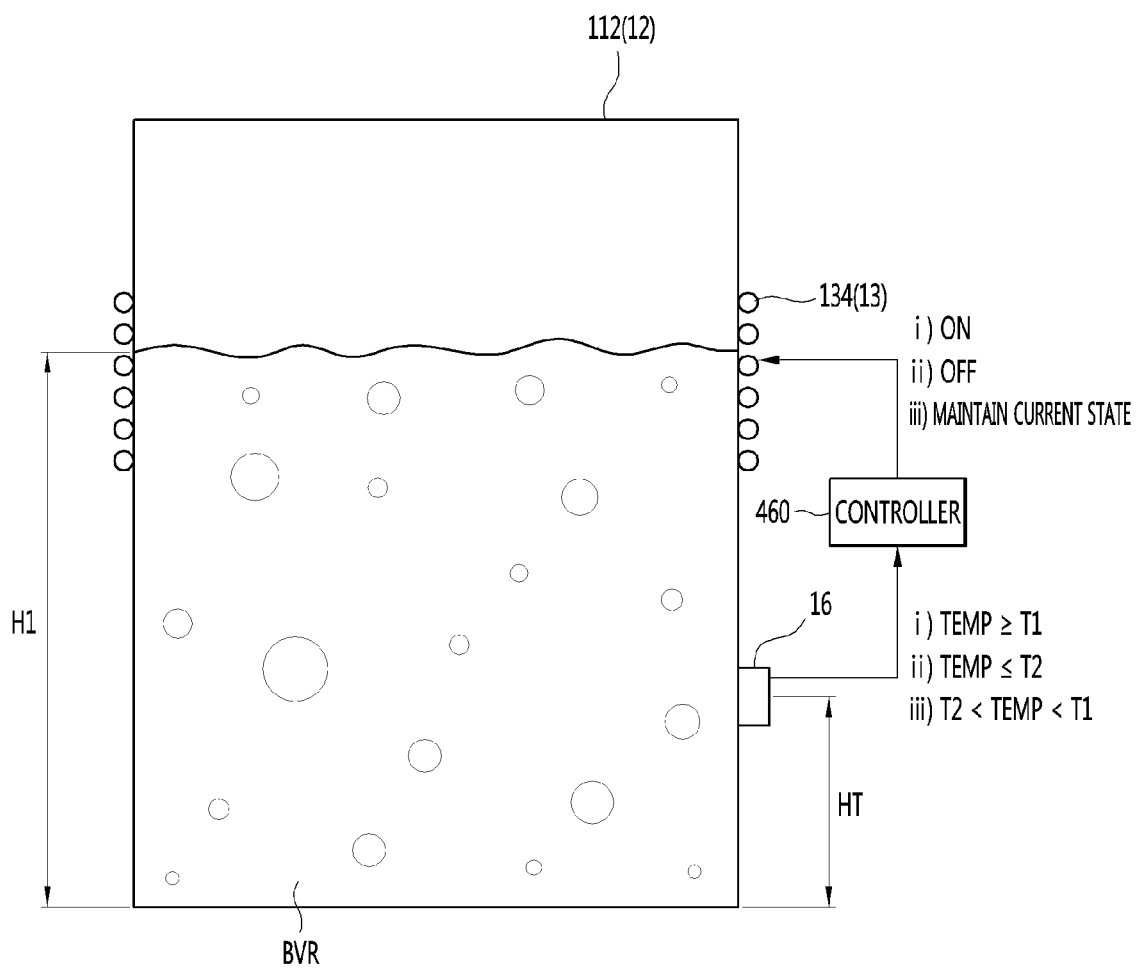

FIGS. 9 and 10 are exemplary diagrams related to a control operation of FIG. 8. Referring to FIG. 9, when the remaining amount of the beverage BVR is greater than the reference amount, the height H1 of the beverage BVR accommodated in the fermentation tank 112 or the fermentation container 12 may be higher than the height HT of the temperature sensor 16.

In this case, when the temperature sensed by the temperature sensor 16 is equal to or greater than a first temperature T1, the controller 460 may drive the refrigerant cycle device 13 to cool the beverage BVR. The first temperature T1 may correspond to an upper limit of the preset or predetermined storage temperature. As the refrigerant cycle device 13 is driven, the temperature sensed by the temperature sensor 16 may be lowered.

On the other hand, when the temperature sensed by the temperature sensor 16 is less than a second temperature T2, the controller 460 may stop driving of the refrigerant cycle device 13. The second temperature T2 may correspond to the lower limit of the preset or predetermined storage temperature.

When the temperature sensed by the temperature sensor 16 is between the second temperature T2 and the first temperature T1, the controller 460 may maintain a driving state of the refrigerant cycle device 13. For example, when the sensed temperature is between the second temperature T2 and the first temperature T1 while the refrigerant cycle device 13 is driven, the controller 460 may continuously drive the refrigerant cycle device 13. On the other hand, when the sensed temperature is between the second temperature T2 and the first temperature T1 while the refrigerant cycle device 13 is not driven, the controller 460 may maintain a state in which the refrigerant cycle device 13 is not being driven.

Therefore, the temperature of the beverage accommodated in the fermentation tank 112 or the fermentation container 12 may be maintained in a predetermined temperature range based on the preset or predetermined storage temperature.

On the other hand referring to FIG. 10, when the remaining amount of the beverage BVR is less than the reference amount, the height H2 of the beverage BVR accommodated in the fermentation tank 112 or the fermentation container 12 may be lower than the height HT of the temperature sensor 16. In this case, when the temperature sensed by the temperature sensor 16 is equal to or greater than a third temperature T3, the controller 460 may drive the refrigerant cycle device 13 to cool the beverage BVR. The third temperature T3 is the upper limit of the preset or predetermined storage temperature and may be higher than the first temperature T1 of FIG. 9. As the refrigerant cycle device 13 is driven, the temperature sensed by the temperature sensor 16 may be lowered.

When the temperature detected by the temperature sensor 16 is less than a fourth temperature T4, the controller 460 may stop driving of the refrigerant cycle device 13. The fourth temperature T4 is the lower limit of the preset or predetermined storage temperature and may be higher than the second temperature T2 of FIG. 9. The third temperature T3 and the fourth temperature T4 are temperatures for maintaining the temperature of the beverage BVR in substantially the same range as the temperature of the beverage BVR in the embodiment of FIG. 9, and may be set by experiment or simulation.

When the temperature sensed by the temperature sensor 16 is between the fourth temperature T4 and the third temperature T3, the controller 460 may maintain the driving state of the refrigerant cycle device 13. For example, when the sensed temperature is between the fourth temperature T4 and the third temperature T3 while the refrigerant cycle device 13 is driven, the controller 460 may continuously drive the refrigerant cycle device 13. On the other hand, when the sensed temperature is between the fourth temperature T4 and the third temperature T3 while the refrigerant cycle device 13 is not driven, the controller 460 may maintain a state in which the refrigerant cycle device 13 is not being driven.

That is, when the remaining amount of the beverage BVR is lower than the reference amount, the fermentation and aging apparatus may perform resetting by increasing the storage temperature, thereby preventing the increase in the operation rate and the number of interruptions of the refrigerant cycle device 13. Therefore, the problem of deterioration of reliability of the compressor and increase in unnecessary power consumption due to the increase in the operation rate and the increase in the number of interruptions in the refrigerant cycle device 13 may be solved. In addition, the problem that quality of the stored beverage is degraded due to supercooling of the beverage may also be prevented.

According to various embodiments, when the remaining amount of the beverage is lower than the reference amount, the fermentation and aging apparatus may perform resetting by increasing the storage temperature, thereby preventing degradation in quality of the beverage due to supercooling of the beverage.

In addition, the fermentation and aging apparatus may perform resetting by increasing the storage temperature, thereby preventing the problem of increasing the operation rate and the number of interruptions of the refrigerant cycle device when the remaining amount of the beverage is lower than the reference amount. Therefore, it is possible to minimize degradation in reliability of the compressor due to the increase in the operation rate and the number of interruptions of the refrigerant cycle apparatus and to prevent unnecessary increase in power consumption. In addition, the fermentation and aging apparatus may effectively calculate the dispensed amount and the remaining amount based on pressure and time measured during dispensing of the beverage, without a separate sensor for sensing the flow rate of the beverage.

Embodiments disclosed herein provide a fermentation and aging apparatus capable of preventing a beverage from being supercooled when a remaining amount of the beverage accommodated in a fermentation tank is reduced. The fermentation and aging apparatus according to embodiments may reset a storage temperature of a beverage when a temperature sensor does not accurately sense a temperature of the beverage as a remaining amount of the beverage is lower than a reference amount.

When a refrigerant cycle device is not driven, a temperature increase rate of a fermentation tank may be higher than a temperature increase rate of a beverage. Therefore, the fermentation and aging apparatus may prevent supercooling of the beverage by increasing the storage temperature when the remaining amount of the beverage is lower than the reference amount. The reference amount may correspond to the remaining amount of the beverage when a height of the beverage accommodated in the fermentation tank is a height at which the temperature sensor is mounted.

According to embodiments disclosed herein, the fermentation and aging apparatus may notify a dispensing completion and perform a cleaning operation when the remaining amount of the beverage is checked as a dispensing completion remaining amount which is lower than a reference amount of the beverage.

According to embodiments disclosed herein, a fermentation and aging apparatus may calculate an average pressure for each reference time using a gas pressure sensor in a state in which a limit switch of a beverage dispenser is turned on, and may obtain a dispensed amount for each reference time based on the calculated average pressure. The fermentation and aging apparatus may calculate the dispensed amount of beverage and the remaining amount of the beverage while the limit switch is turned on, based on the dispensed amount for each reference time.

The above description is merely illustrative of the technical idea of the present disclosure, and various modifications and changes may be made thereto by those skilled in the art without departing from the essential characteristics of the present disclosure.

Therefore, embodiments disclosed herein are not intended to limit the technical spirit but to describe the technical idea, and the technical spirit is not limited by these embodiments. The scope of protection should be interpreted by the appended claims, and all technical ideas within the scope of equivalents should be construed as falling within the scope.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fermentation and aging apparatus, comprising:
   a fermentation tank defining an accommodation space in which a beverage is accommodated;
   a refrigerant cycle device configured to cool the fermentation tank and the beverage;
   a temperature sensor mounted on an outer circumferential surface of the fermentation tank; and
   a controller configured to:
      control driving of the refrigerant cycle device based on a temperature sensed by the temperature sensor and a predetermined storage temperature;
      check a remaining amount of the beverage accommodated in the fermentation tank; and
      reset a storage temperature of the beverage when the checked remaining amount is lower than a predetermined reference amount, wherein the refrigerant cycle device comprises a compressor, and an evaporator configured to contact a region including a first height on the outer circumferential surface of the fermentation tank, wherein the temperature sensor is mounted so as to be spaced apart from the evaporator on the outer circumferential surface of the fermentation tank corresponding to a second height lower than the first height, and wherein the predetermined reference amount corresponds to the remaining amount of the beverage when the height of the beverage accommodated in the fermentation tank is at the second height.

2. The fermentation and aging apparatus according to claim 1, wherein when the checked remaining amount is equal to or greater than the predetermined reference amount, the controller is configured to:
drive the refrigerant cycle device when the sensed temperature is equal to or greater than an upper limit of the predetermined storage temperature; and
stop driving of the refrigerant cycle device when the sensed temperature is equal to or less than a lower limit of the predetermined storage temperature.

3. The fermentation and aging apparatus according to claim 1, wherein the controller is configured to increase the storage temperature when the checked remaining amount is less than the predetermined reference amount.

4. The fermentation and aging apparatus according to claim 1, wherein the controller is configured to stop driving of the refrigerant cycle device when the checked remaining amount is equal to or less than a dispensing completion remaining amount which is lower than the reference amount.

5. The fermentation and aging apparatus according to claim 4, wherein the controller is configured to output a dispensing completion notification through a display when the checked remaining amount is equal to or less than the dispensing completion remaining amount.

6. A fermentation and aging apparatus, comprising:
a fermentation tank defining an accommodation space in which a beverage is accommodated;
a refrigerant cycle device configured to cool the fermentation tank and the beverage;
a temperature sensor mounted on an outer circumferential surface of the fermentation tank; and
a controller configured to:
control driving of the refrigerant cycle device based on a temperature sensed by the temperature sensor and a predetermined storage temperature;
check a remaining amount of the beverage accommodated in the fermentation tank; and
reset a storage temperature of the beverage when the checked remaining amount is lower than a predetermined reference amount, wherein the controller is configured to increase the storage temperature when the checked remaining amount is less than the predetermined reference amount, and wherein when the checked remaining amount is less than the predetermined reference amount, the controller is configured to:
drive the refrigerant cycle device when the sensed temperature is equal to or greater than an upper limit of the increased storage temperature; and
stop driving of the refrigerant cycle device when the sensed temperature is equal to or less than a lower limit of the increased storage temperature.

7. A fermentation and aging apparatus, comprising:
a fermentation tank defining an accommodation space in which a beverage is accommodated;
a refrigerant cycle device configured to cool the fermentation tank and the beverage and including an evaporator mounted on the fermentation tank at a first height;
a temperature sensor mounted on the fermentation tank at a second height spaced apart from the evaporator and lower than the first height; and
a controller configured to:
control driving of the refrigerant cycle device based on a temperature sensed by the temperature sensor and a predetermined storage temperature;
check a remaining amount of the beverage accommodated in the fermentation tank; and
reset a storage temperature of the beverage when the checked remaining amount is lower than a predetermined reference amount, wherein the predetermined reference amount corresponds to the remaining amount of the beverage when a height of the beverage accommodated in the fermentation tank is at the second height.

8. The fermentation and aging apparatus according to claim 7, wherein when the checked remaining amount is equal to or greater than the predetermined reference amount, the controller is configured to:
drive the refrigerant cycle device when the sensed temperature is equal to or greater than an upper limit of the predetermined storage temperature; and
stop driving of the refrigerant cycle device when the sensed temperature is equal to or less than a lower limit of the predetermined storage temperature.

9. The fermentation and aging apparatus according to claim 7, wherein the controller is configured to increase the storage temperature when the checked remaining amount is less than the predetermined reference amount.

10. The fermentation and aging apparatus according to claim 9, wherein when the checked remaining amount is less than the predetermined reference amount, the controller is configured to:
drive the refrigerant cycle device when the sensed temperature is equal to or greater than an upper limit of the increased storage temperature; and
stop driving of the refrigerant cycle device when the sensed temperature is equal to or less than a lower limit of the increased storage temperature.

11. The fermentation and aging apparatus according to claim 7, wherein the controller is configured to stop driving of the refrigerant cycle device when the checked remaining amount is equal to or less than a dispensing completion remaining amount which is lower than the predetermined reference amount and output a dispensing completion notification through a display when the checked remaining amount is equal to or less than the dispensing completion remaining amount.

* * * * *